US012632513B2

(12) United States Patent
Mizobuchi

(10) Patent No.: US 12,632,513 B2
(45) Date of Patent: May 19, 2026

(54) COMPUTER-READABLE RECORDING MEDIUM STORING LEARNING SUPPORT PROGRAM, LEARNING SUPPORT METHOD, AND LEARNING SUPPORT DEVICE

(71) Applicant: FUJITSU LIMITED, Kawasaki (JP)

(72) Inventor: Yuji Mizobuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 895 days.

(21) Appl. No.: 17/863,511

(22) Filed: Jul. 13, 2022

(65) Prior Publication Data

US 2022/0374648 A1      Nov. 24, 2022

Related U.S. Application Data

(63) Continuation of application No. PCT/JP2020/001382, filed on Jan. 16, 2020.

(51) Int. Cl.
*G06F 16/00* (2019.01)
*G06F 18/22* (2023.01)
(Continued)

(52) U.S. Cl.
CPC .............. *G06F 18/22* (2023.01); *G06F 18/23* (2023.01); *G06N 3/045* (2023.01)

(58) Field of Classification Search
CPC .......... G06F 18/22; G06F 18/23; G06N 3/045
(Continued)

(56) References Cited

U.S. PATENT DOCUMENTS

2011/0231350 A1      9/2011  Momma et al.
2012/0030157 A1      2/2012  Tsuchida et al.
2019/0130073 A1 *    5/2019  Sun ........................ G16H 10/60

FOREIGN PATENT DOCUMENTS

JP          2010-198518  A       9/2010
JP          2013-161295  A       8/2013
(Continued)

OTHER PUBLICATIONS

Shogo Okada et al., "Image Classification System based on Interaction with Human", Proceedings of the 24th Annual Conference of the Japanese Society for Artificial Intelligence, Session ID: 2G2-OS9-6, ISSN: 1347-9881, pp. 1-4, Jun. 9-11, 2010, DOI: https://doi.org/10.11517/pjsai.JSAI2010.0_2G2OS96 (Total 15 pages).
(Continued)

*Primary Examiner* — Raquel Perez-Arroyo

(74) *Attorney, Agent, or Firm* — Fujitsu Intellectual Property Center

(57) ABSTRACT

A recording medium stores a program for causing a computer to execute a process including: calculating a first embedded vector for each cluster obtained by clustering samples in training data, by inputting the samples that represent the clusters to a first distance metric model; performing training of a second distance metric model, based on labels set in pairs of the samples; calculating a second embedded vector for each cluster, by inputting the samples that represent the clusters to the second distance metric model; detecting pairs of the clusters that are likely to be integrated when the training is performed with a greater number of epochs than a number of epochs at a time of the training of the second distance metric model, based on the first embedded vector and the second embedded vector; and outputting one of the pairs of the clusters in which a similarity label is not set.

6 Claims, 14 Drawing Sheets

(51) Int. Cl.
    *G06F 18/23*     (2023.01)
    *G06N 3/045*     (2023.01)

(58) Field of Classification Search
    USPC ........................................................... 706/15
    See application file for complete search history.

(56)               References Cited

FOREIGN PATENT DOCUMENTS

| | | | |
|---|---|---|---|
| WO | 2010/061813 | A1 | 6/2010 |
| WO | 2010/119615 | A1 | 10/2010 |

OTHER PUBLICATIONS

Kilian Q. Weinberger et al., "Distance Metric Learning for Large Margin Nearest Neighbor Classification", Advances in Neural Information Processing Systems, 2006 (Total 8 pages).

Xingyu Gao et al., "SOML: Sparse Online Metric Learning with Application to Image Retrieval", Proceedings of the 28th AAAI Conference on Artificial Intelligence, pp. 1206-1212, 2014 (Total 7 pages).

Eric P. Xing et al., "Distance Metric Learning, with Application to Clustering with Side-Information", Neural Information Processing Systems (NIPS), 2003 (Total 8 pages).

International Search Report and Written Opinion of the International Searching Authority (Form PCT/ISA/210, 220, and 237), mailed in connection with PCT/JP2020/001382 and mailed Mar. 31, 2020 (Total 13 pages).

* cited by examiner

FIG. 6

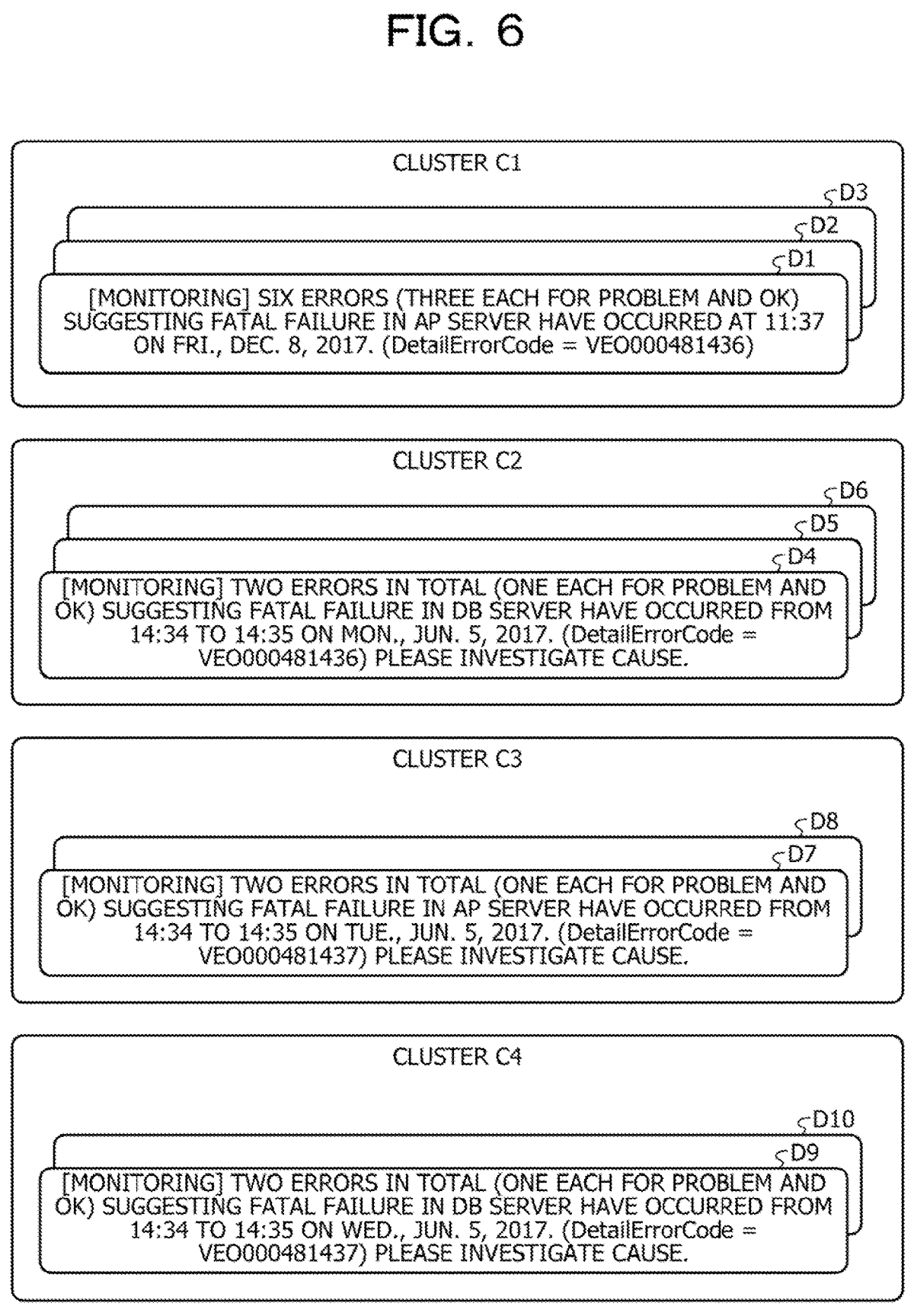

CLUSTER C1

D3
D2
D1

[MONITORING] SIX ERRORS (THREE EACH FOR PROBLEM AND OK) SUGGESTING FATAL FAILURE IN AP SERVER HAVE OCCURRED AT 11:37 ON FRI., DEC. 8, 2017. (DetailErrorCode = VEO000481436)

CLUSTER C2

D6
D5
D4

[MONITORING] TWO ERRORS IN TOTAL (ONE EACH FOR PROBLEM AND OK) SUGGESTING FATAL FAILURE IN DB SERVER HAVE OCCURRED FROM 14:34 TO 14:35 ON MON., JUN. 5, 2017. (DetailErrorCode = VEO000481436) PLEASE INVESTIGATE CAUSE.

CLUSTER C3

D8
D7

[MONITORING] TWO ERRORS IN TOTAL (ONE EACH FOR PROBLEM AND OK) SUGGESTING FATAL FAILURE IN AP SERVER HAVE OCCURRED FROM 14:34 TO 14:35 ON TUE., JUN. 5, 2017. (DetailErrorCode = VEO000481437) PLEASE INVESTIGATE CAUSE.

CLUSTER C4

D10
D9

[MONITORING] TWO ERRORS IN TOTAL (ONE EACH FOR PROBLEM AND OK) SUGGESTING FATAL FAILURE IN DB SERVER HAVE OCCURRED FROM 14:34 TO 14:35 ON WED., JUN. 5, 2017. (DetailErrorCode = VEO000481437) PLEASE INVESTIGATE CAUSE.

Figure 7:
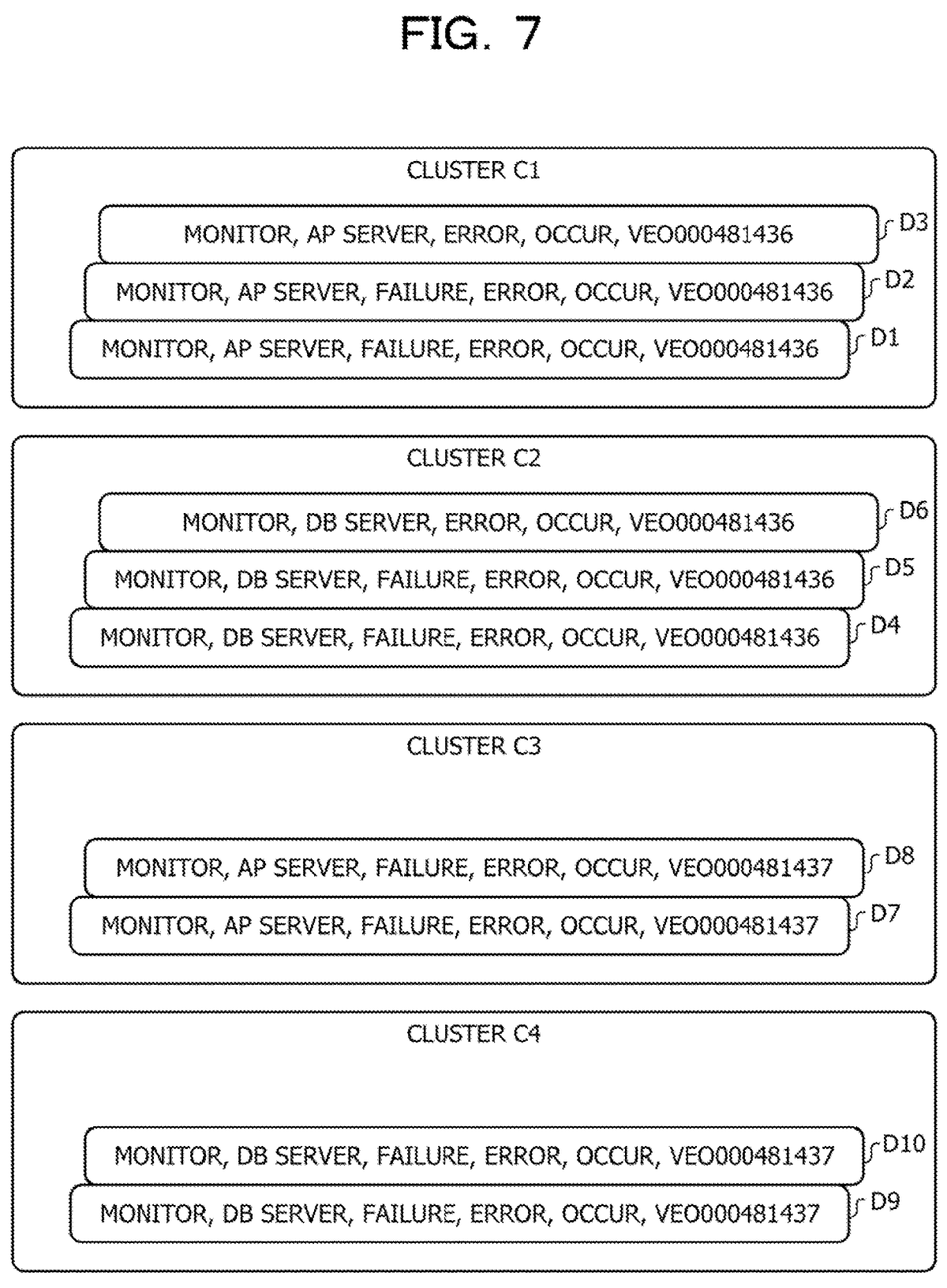

CLUSTER C1

MONITOR, AP SERVER, ERROR, OCCUR, VEO000481436 ⌐ D3

MONITOR, AP SERVER, FAILURE, ERROR, OCCUR, VEO000481436 ⌐ D2

MONITOR, AP SERVER, FAILURE, ERROR, OCCUR, VEO000481436 ⌐ D1

---

CLUSTER C2

MONITOR, DB SERVER, ERROR, OCCUR, VEO000481436 ⌐ D6

MONITOR, DB SERVER, FAILURE, ERROR, OCCUR, VEO000481436 ⌐ D5

MONITOR, DB SERVER, FAILURE, ERROR, OCCUR, VEO000481436 ⌐ D4

---

CLUSTER C3

MONITOR, AP SERVER, FAILURE, ERROR, OCCUR, VEO000481437 ⌐ D8

MONITOR, AP SERVER, FAILURE, ERROR, OCCUR, VEO000481437 ⌐ D7

---

CLUSTER C4

MONITOR, DB SERVER, FAILURE, ERROR, OCCUR, VEO000481437 ⌐ D10

MONITOR, DB SERVER, FAILURE, ERROR, OCCUR, VEO000481437 ⌐ D9

COMPUTER-READABLE RECORDING MEDIUM STORING LEARNING SUPPORT PROGRAM, LEARNING SUPPORT METHOD, AND LEARNING SUPPORT DEVICE

CROSS-REFERENCE TO RELATED APPLICATION

This application is a continuation application of International Application PCT/JP2020/001382 filed on Jan. 16, 2020 and designated the U.S., the entire contents of which are incorporated herein by reference.

FIELD

The embodiments discussed herein are related to a learning support program, a learning support method, and a learning support device.

BACKGROUND

As an example of distance metric learning, not only Mahalanobis distance learning but also deep metric learning or the like using the deep learning technique has been proposed.

Japanese Laid-open Patent Publication No. 2010-198518, Weinberger, Kilian Q., John Blitzer, and Lawrence K. Saul. "Distance metric learning for large margin nearest neighbor classification.", Advances in neural information processing systems, 2006, Gao, Xingyu, et al. "SOML: Sparse Online Metric Learning with Application to Image Retrieval.", Association for the Advancement of Artificial Intelligence (AAAI), 2014, and E. P. Xing, A. Y. Ng, M. I. Jordan and S. Russell: "Distance metric learning, with application to clustering with side-information", Neural Information Processing Systems (NIPS) (2003) are disclosed as related art.

SUMMARY

According to an aspect of the embodiments, a non-transitory computer-readable recording medium stores a training support program for causing a computer to execute a process including: calculating a first embedded vector for each of clusters obtained by clustering samples included in training data, by inputting the samples that represent the clusters to a first distance metric model; performing training of a second distance metric model from the first distance metric model, based on labels set in pairs of the samples included in the training data; calculating a second embedded vector for each of the clusters, by inputting the samples that represent the clusters to the second distance metric model; detecting pairs of the clusters that are likely to be integrated when the training is performed with a greater number of epochs than a number of epochs at a time of the training of the second distance metric model, based on the first embedded vector of each of the clusters and the second embedded vector of each of the clusters; and outputting one of the pairs of the clusters in which a similarity label is not set, among the pairs of the clusters.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of document data;

FIG. 7 is a diagram illustrating an example of word string extraction results;

DESCRIPTION OF EMBODIMENTS

However, at the time of relearning of a model in which the above-mentioned distance metric learning has been performed, labels set among pieces of data of learning samples sometimes adversely affect the model after the relearning.

In one aspect, it is an object of the embodiments to provide a learning support program, a learning support method, and a learning support device capable of suppressing adversely affecting a distance metric model after relearning.

A learning support program, a learning support method, and a learning support device according to the present application will be described below with reference to the attached drawings. Note that the present embodiments do not limit the disclosed technique. Additionally, each of the embodiments may be suitably combined within a range without causing contradiction between processing contents.

First Embodiment

[1. System Configuration]

Figure 1:
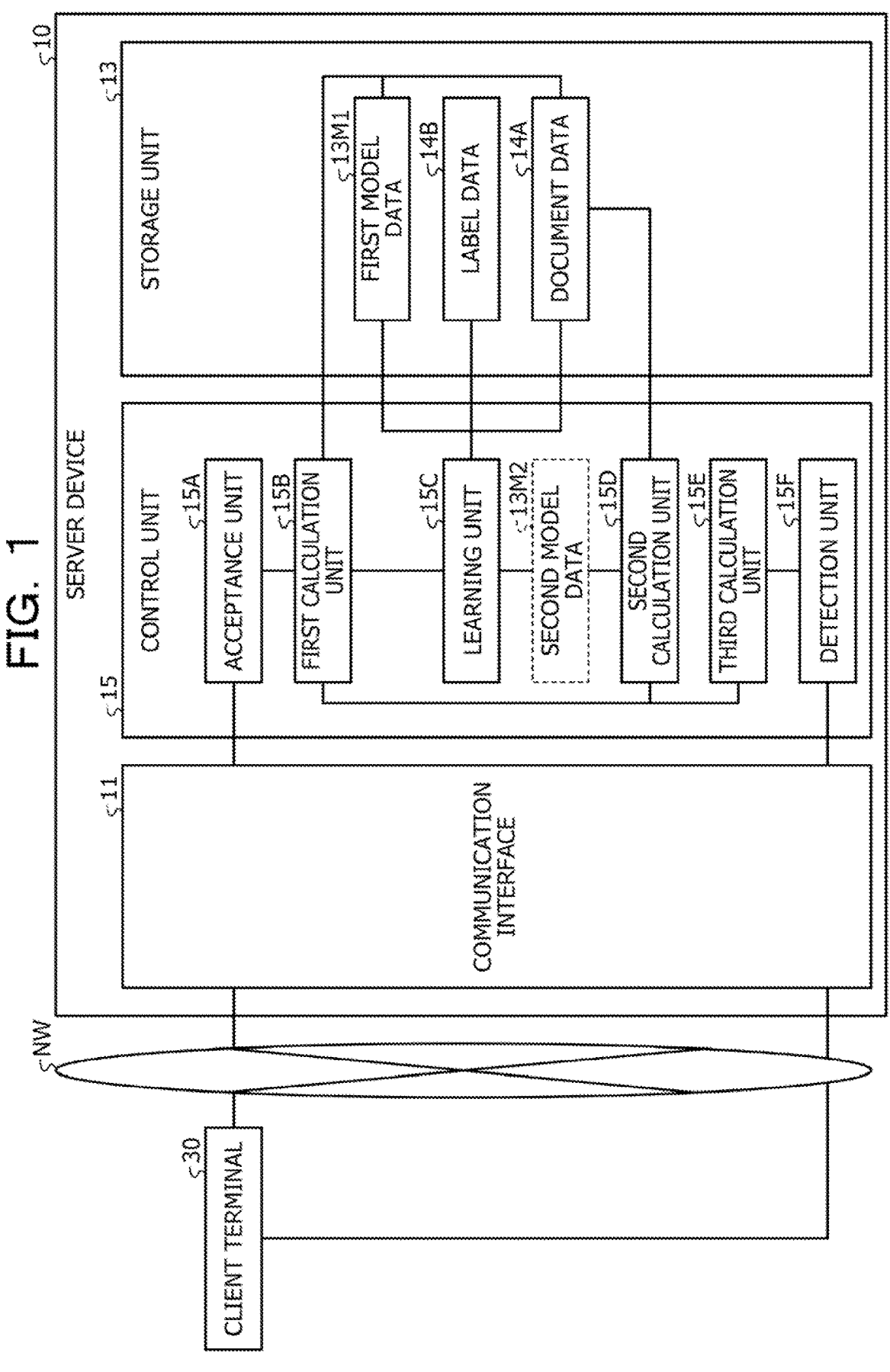
FIG. 1 is a diagram illustrating a configuration example of a system according to a first embodiment.

FIG. 1 is a diagram illustrating a configuration example of a system according to a first embodiment. A system 1 illustrated in FIG. 1 provides a function corresponding to any machine learning task such as class classification, merely as one aspect.

As illustrated in FIG. 1, the system 1 may include a server device 10 and a client terminal 30. These server device 10 and client terminal 30 are connected so as to be capable of communicating with each other via a network NW. For example, the network NW may be an optional type of communication network such as the Internet or a local area network (LAN) regardless of whether the network NW is wired or wireless. Note that, although an example in which one client terminal 30 is connected to one server device 10 is given in FIG. 1, this is merely a schematic diagram and does not conflict with connecting a plurality of client terminals 30 to one server device 10.

The server device 10 is an example of a computer that executes the above-mentioned class classification. The server device 10 may correspond to the learning support device.

As one embodiment, the server device 10 may be implemented by installing a classification program that achieves the function corresponding to the above-mentioned class classification on any computer. For example, the server device 10 may be implemented as a server that provides a function relating to the above-mentioned class classification on-premises. Alternatively, the server device 10 may also be implemented as a software as a service (SaaS) type application to provide a function corresponding to the above-mentioned class classification as a cloud service.

The client terminal 30 corresponds to an example of a computer that is provided with a function corresponding to the above-mentioned class classification. For example, a desktop computer such as a personal computer, or the like corresponds to the client terminal 30. This is merely an example, and the client terminal 30 may be an optional computer such as a laptop computer, a mobile terminal device, or a wearable terminal.

[2. Task Implementation Example]

Examples of a function in which the above-mentioned class classification task can be implemented include a similarity discrimination function between documents that discriminates similarity or dissimilarity between two documents. As a mere example, the above-mentioned similarity discrimination function between documents allows the construction of a failure isolation graph in which similar case samples between trouble events and trouble causes are associated from past case collections relating to operational management of information technology (IT) services, or the like. The failure isolation graph constructed in this manner, as a mere example, may achieve a function of outputting a recommendation of the trouble cause corresponding to the trouble event when dealing with a trouble, or the like.

[3. Background Technique]

From the aspect of improving the discrimination accuracy of the class classification in the task exemplified by such a similarity discrimination function between documents or the like, techniques such as selection of a feature amount based on the degree of importance of the feature amount and a method of learning a feature amount space are sometimes incorporated in the class classification.

[3.1 Mahalanobis Distance Learning]

Distance metric learning represented by the Mahalanobis distance learning is known as an example of a method of learning the feature amount space. In so-called distance metric learning, a transformation is learned in which the degree of similarity between samples in the input space is made to correspond to the distance in the feature amount space. For example, in the distance metric learning, the original space is distorted such that the distance between samples belonging to the same class becomes closer and the distance between samples belonging to different classes becomes farther. Note that the "feature amount space" is referred to as a metric space or an embedded space in some cases.

For example, in the Mahalanobis distance learning, a Mahalanobis distance $d_{M(x, x')}$ indicated by following formula (1) is defined, and learning is performed with the component of M as a design variable. Such an optimization problem of M is equivalent to learning a transformation L that makes the Euclidean distance between samples correspond to the degree of similarity between samples. From this, the transformation L can be learned by solving the problem of minimizing the loss function in following formula (2).

[Formula 1]

$$d_M(x, x') = \sqrt{(x - x')^T M (x - x')}$$ (1)

[Formula 2]

$$\varepsilon(L) = (1 - \mu)\varepsilon_{pull}(L) + \mu\varepsilon_{push}(L).$$ (2)

In above formula (2), "L" stands for a matrix that performs a linear transformation from the input space and has a relation of M=L^TL. Among the two loss (penalty) functions included in above formula (2), $\varepsilon_{pull}(L)$ is denoted by following formula (3), and also $\varepsilon_{push}(L)$ is denoted by following formula (4). In following formula (3) and following formula (4), "j (arrow symbol) i" means that $x_j$ is in the neighborhood of $x_i$.

[Formula 3]

$$\varepsilon_{pull}(L) = \sum \left\| L(\vec{x}_i - \vec{x}_j) \right\|^2.$$ (3)

[Formula 4]

$$\varepsilon_{push}(L) = \sum \sum_l (1 - y_{il})\left[1 + \left\| L(\vec{x}_i - \vec{x}_j) \right\|^2 - \left\| L(\vec{x}_i - \vec{x}_l) \right\|^2\right]_+.$$ (4)

In these $\varepsilon_{pull}(L)$ and $\varepsilon_{push}(L)$, k neighborhood instances j of a certain instance i are used based on the k-nearest neighbor method. For example, according to $\varepsilon_{pull}(L)$ indicated in above formula (3), a penalty is given when the distance between instances having the same label is large. Furthermore, according to $\varepsilon_{push}(L)$ indicated in above formula (4), a penalty is given when the distance between instances having different labels is small.

[3.2 Selection of Feature Amount]

As a method for finding the degree of importance of the feature amount, there is a method of learning the diagonal component of M in the Mahalanobis distance. For example, from the aspect of coping with the scalability of learning data and feature amount, by altering the elements other than the diagonal component of M in the Mahalanobis distance to zero, the relationship between different feature amounts is ignored, and the degree of importance of each feature amount is learned.

Additionally, a method using a decision tree is known as a method for finding the degree of importance of the feature amount. For example, the decision tree is generated by repeating the selection of a feature amount that divides nodes. When the feature amount is selected in this manner, the degree of importance is calculated for each feature amount. For example, the degree of importance FI($f_j$) of the j-th feature amount $f_j$ can be calculated by computing the sum of information gains I at all the nodes as in following formula (5).

[Formula 5]

$$FI(f_j) = \sum_{t \in N_{f_j}}^n I(t, f_j)$$ (5)

The "information gains I" in above formula (5) refer to the amount of information obtained when division from a parent node to child nodes happens. The "parent node" mentioned here refers to a node before being divided by the branch of the feature amount, whereas the "child node" refers to a node after being divided by the branch of the feature amount.

Furthermore, the amount of information $I(D_p, f)$ obtained when division by the branch of the feature amount happens in the decision tree can be denoted by following formula (6). In following formula (6), "f" refers to the feature amount selected for the branch. In addition, "$D_p$" refers to the parent node. Furthermore, "$D_{left}$" refers to a child node on the left side after branching, whereas "$D_{right}$" refers to a child node on the right side after branching. Furthermore, "$N_p$" refers to the number of samples in the parent node. Furthermore, "$N_{left}$" refers to the number of samples of the child node on the left side, whereas "$D_{right}$" refers to the number of samples of the child node on the right side.

[Formula 6]

$$I(D_p, f) = I(D_p) - \frac{N_{left}}{N_p I(D_{left})} - \frac{N_{right}}{N_p I(D_{right})} \quad (6)$$

A feature amount that maximizes such an amount of information, which is a feature amount capable of decreasing the impureness between the parent node and the child node to the maximum, is selected for the branch of the decision tree. As a mere example, the Gini coefficient, entropy, and the like can be used as the above amount of information. For example, a Gini coefficient $I_G(t)$ can be calculated by following formula (7). In addition, an entropy $I_H(t)$ can be calculated by following formula (8).

[Formula 7]

$$I_G(t) = 1 - \sum_{i=1}^{c} p(i \mid t)^2 \quad (7)$$

[Formula 8]

$$I_H(t) = -\sum_{i=1}^{c} p(i \mid t)\log_2 p(i \mid t) \quad (8)$$

[3.3 Variations of Mahalanobis Distance Learning]

As a variation of the above-described Mahalanobis distance learning, there is a document that discloses a clustering distance learning device or the like. The problem with this clustering distance learning device is that the Mahalanobis distance matrix A described in the aforementioned E. P. Xing, A. Y. Ng, M. I. Jordan and S. Russell: "Distance metric learning, with application to clustering with side-information", Neural Information Processing Systems (NIPS) (2003) performs estimation by iterative arithmetic operation from the learning data.

From the aspect of solving such a problem, the clustering distance learning device performs the following processing instead of the algorithm described in E. P. Xing, A. Y. Ng, M. I. Jordan and S. Russell: "Distance metric learning, with application to clustering with side-information", Neural Information Processing Systems (NIPS) (2003), which performs iterative arithmetic operation until the Mahalanobis distance matrix A converges. For example, in the clustering distance learning device, the estimation algorithm of the Mahalanobis distance matrix A described in E. P. Xing, A. Y. Ng, M. I. Jordan and S. Russell: "Distance metric learning, with application to clustering with side-information", Neural Information Processing Systems (NIPS) (2003) is formulated into a problem that minimizes a function J of the matrix A and the cluster center $p_k$ under the constraint condition that limits the size of the Mahalanobis distance matrix A. The Mahalanobis distance matrix A is computed in accordance with following formula (9) obtained by such a formulation.

[Formula 9]

$$A = \frac{\sum_n \sum_k r_{nk}(x_n - \mu_k)(x_n - \mu_k)^T}{\left( tr\left( \sum_{n,k} \sum_{n',k'} r_{nk} r_{n'k'} (x_n - \mu_k)(x_n - \mu_k)^T (x_{n'} - \mu_{k'})(x_{n'} - \mu_{k'})^T \right) \right)^{1/2}}$$

In above formula (9), "$x_n$" and "$x_n$" refer to the feature amount of the instances. In addition, "$\mu_k$" and "$\mu_k$" refer to the center of the cluster k or cluster k'. In addition, "$r_{nk}$" and "$r_{nk}$" denote the correspondence between the instance and the cluster. For example, "$r_{nk}$" is denoted by "1" when the instance $x_n$ belongs to the cluster k, while it is denoted by "0" in other cases. In addition, "$r_{n'k}$" is denoted by "1" when the instance $x_n$' belongs to the cluster k', while it is denoted by "0" in other cases. In addition, "$tr(A^T A)$" refers to the constraint condition for the matrix A.

[3.4 Distance Metric Learning Using Neural Network]

The above distance metric learning is not limited to the example of learning the linear transformation to the feature amount space as in the above-described Mahalanobis distance learning, and a non-linear transformation to the feature amount space can also be learned by applying a neural network to the distance definition part of the class classification model.

[3.4.1 Multi-Class Classification Model]

Figure 2:
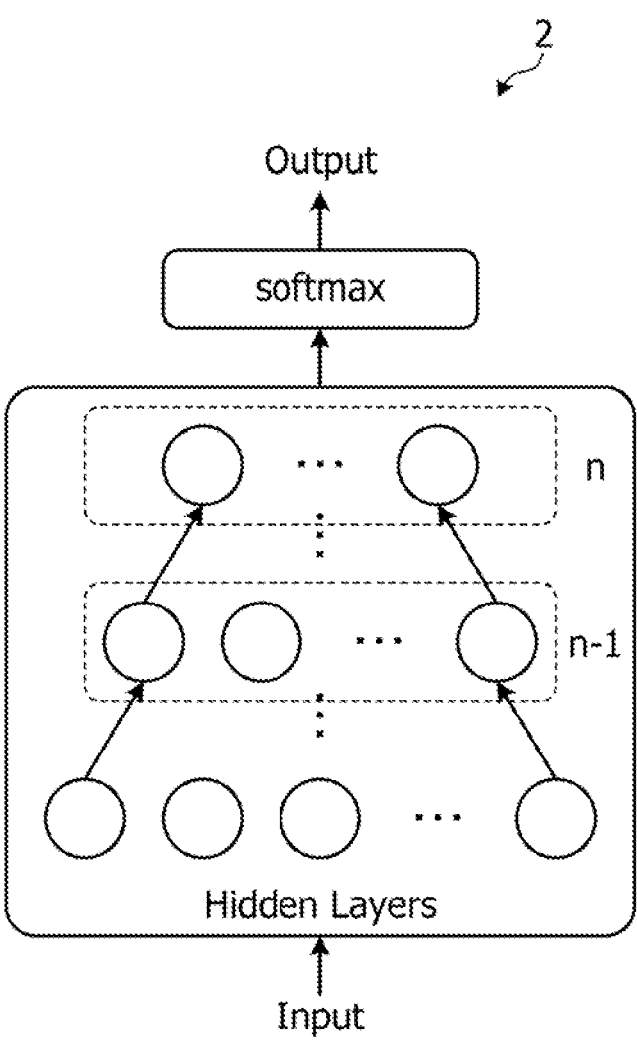
FIG. 2 is a diagram illustrating an example of a multi-class classification model.

In the aspect in which a non-linear transformation to the feature amount space can be fulfilled as a result of model learning, learning of a multi-class classification model can also be regarded as one part of distance metric learning. FIG. 2 is a diagram illustrating an example of the multi-class classification model. FIG. 2 illustrates an example of a multi-class classification model 2 that predicts the label of the class to which an instance of input data belongs. When learning samples assigned with the same label are input to such a multi-class classification model 2, model learning is performed in which the distance between hidden vectors output from the hidden layer (intermediate layer) of the i-th layer becomes closer between the learning samples. Therefore, the hidden vector input to any hidden layer included in the multi-class classification model 2 that has finished learning, such as the hidden layer of the n-1-th layer or the n-th layer illustrated in FIG. 2, may be regarded as being transformed to a position on the metric space corresponding to the label of the class to which the input data belongs. From this, the hidden vector input to any hidden layer can be used as an embedded vector.

[3.4.2 Deep Metric Learning]

The Siamese Network is known as an example of the deep metric learning. The Siamese Network learns a function that maps input data over an appropriate metric space non-linearly while performing dimensional reduction based on similar or dissimilar pairs.

Figure 3:
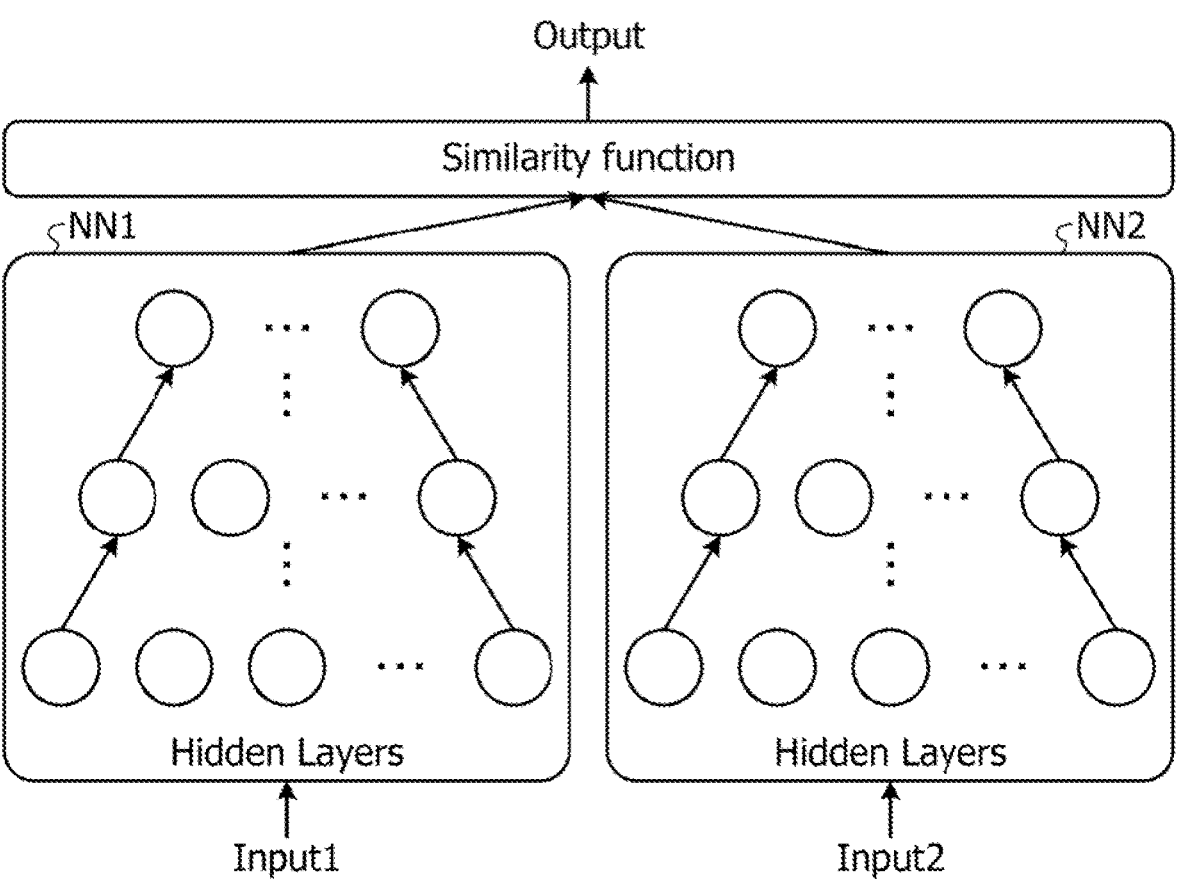
FIG. 3 is a diagram illustrating an example of the structure of a Siamese Network.

FIG. 3 is a diagram illustrating an example of the structure of the Siamese Network. As illustrated in FIG. 3, the Siamese Network inputs a pair of two samples assigned with the similarity or dissimilarity label to two neural networks NN1 and NN2. The parameters and the layer structure are shared between the neural networks NN1 and NN2 to which the pair of two samples are input in this manner. Then, the distance between the samples found from the embedded vector output by the neural network NN1 and the embedded vector output by the neural network NN2 is output as the degree of similarity. After that, parameters of the neural networks NN1 and NN2 that bring the distance of the similar pair closer while bringing the distance of the dissimilar pair farther based on the similarity or dissimilarity label are learned.

Hereinafter, a model in which embedding into the metric space, which is distance metric, is performed, such as the neural networks NN1 and NN2 of the Siamese Network as an example, will be described as a "distance metric model" in some cases.

[4. One Aspect of Problem]

For example, from the aspect of adapting a model that has finished learning also to a new task, fine-tune or the like is performed in some cases to cause a distance metric model that has finished learning to relearn using new data. In this case, there is an aspect that the label set among pieces of data of the learning samples at the time of relearning of the distance metric model mentioned thus far adversely affects the model after relearning in some cases.

Figure 4:
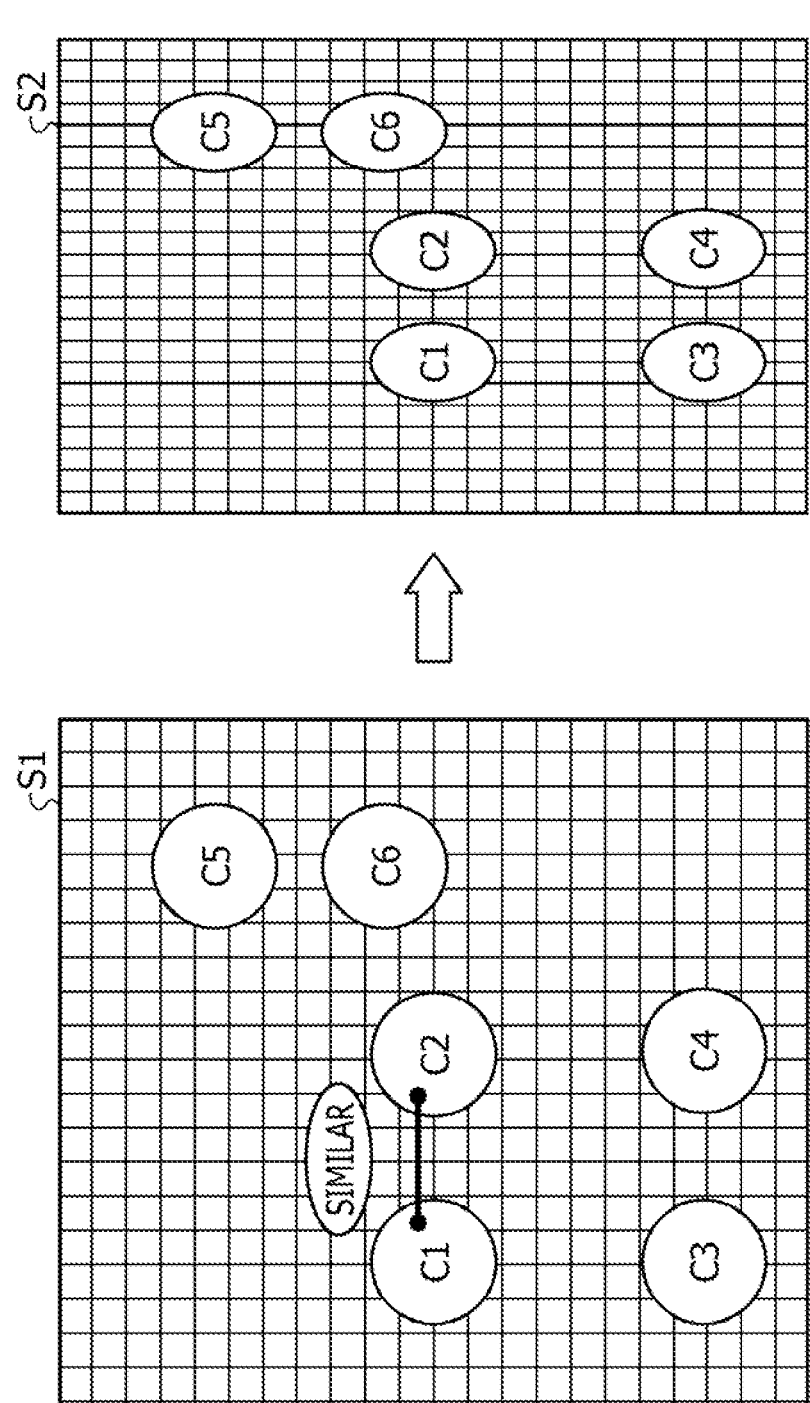
FIG. 4 is a diagram illustrating an example of a metric space.

FIG. 4 is a diagram illustrating an example of the metric space. In FIG. 4, a metric space S1 embedded by the distance metric model before relearning and a metric space S2 embedded by the distance metric model after relearning are illustrated side by side in order from the left. Furthermore, in the metric space S1 and the metric space S2 illustrated in FIG. 4, clustering results obtained by clustering each sample of the learning data used for relearning, based on the embedded vectors before relearning or after relearning are illustrated.

As illustrated in FIG. 4, the metric space S1 before relearning includes six clusters, namely, a cluster C1 to a cluster C6. Here, as a mere example, when relearning is performed in a state in which the similarity label is set in the pair of the clusters C1 and C2 among the above six clusters, the embedding into the metric space S2 is relearned. For example, in the metric space S2, the distance between the clusters C1 and C2 is made closer than the distance in the metric space S1 because of the relearning based on the similarity label set in the pair of the clusters C1 and C2. Not kept within this, in the metric space S2, the distance between the clusters C3 and C4 is also made closer than the distance in the metric space S1. The integration of these clusters C3 and C4 is occasionally not intended by the model designer, and an unexpected model may be obtained by relearning.

From the aspect of avoiding such unexpected situations, setting the similarity or dissimilarity label to all pairs of clusters at the time of relearning may occasionally not be deemed to be realistic from the viewpoint of resources, and there is an aspect in which setting labels is desired to be kept to the minimum.

[5. One Aspect of Problem-Solving Approach]

Thus, the present embodiment provides a learning support function that outputs a pair of clusters that come closer to each other and do not have the similarity label set, based on the embedded vectors output by a distance metric model at each of time points before relearning and in the relearning process. By inquiring about such pairs of clusters in the relearning process, the integration of an unintended pair of clusters due to the similarity or dissimilarity label set at the time of relearning may be suppressed, which may in turn suppress adversely affecting the distance metric model after relearning.

Figure 5:
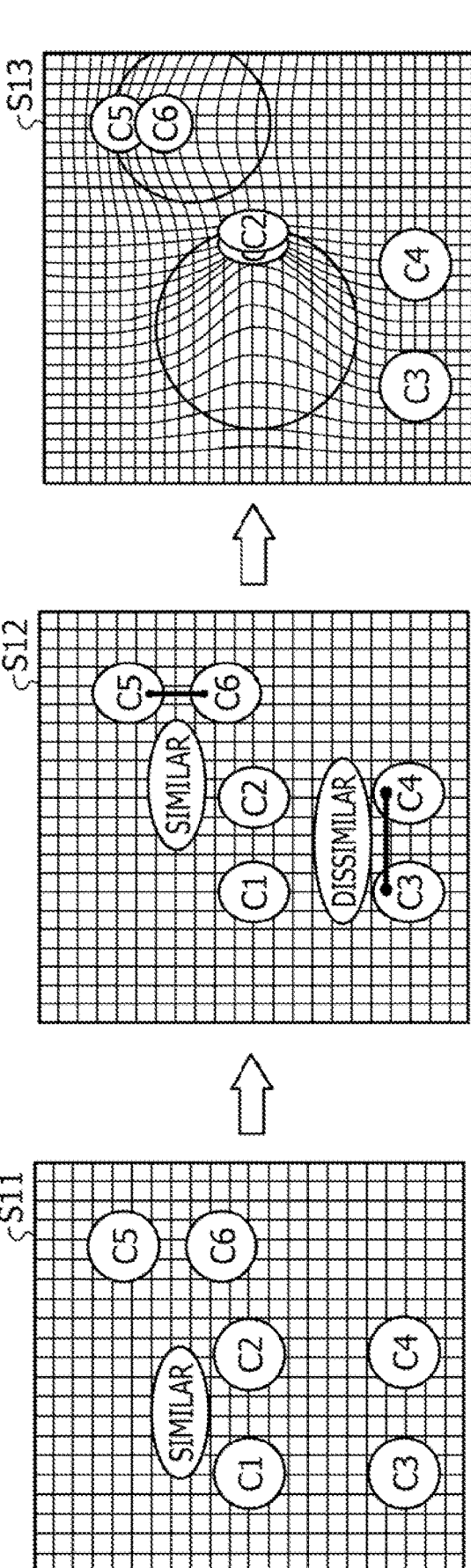
FIG. 5 is a diagram illustrating an example of the metric space.

FIG. 5 is a diagram illustrating an example of the metric space. In FIG. 5, as a mere example of the distance metric learning, a case where the Siamese Network is adopted will be described as an example. In FIG. 5, a metric space S11 embedded by the distance metric model before relearning, a metric space S12 embedded by the distance metric model in the relearning process, and a metric space S13 embedded by the distance metric model after relearning are illustrated side by side in order from the left. Furthermore, in the metric space S11, the metric space S12, and the metric space S13 illustrated in FIG. 5, clustering results obtained by clustering each sample of the learning data used for relearning, based on the embedded vectors before relearning, in the relearning process, or after relearning are illustrated.

As illustrated in FIG. 5, the metric space S11 before relearning includes six clusters, namely, a cluster C1 to a cluster C6. Using the distance metric model before relearning that performs such embedding into the metric space S11, the above-mentioned learning support function performs relearning in a state in which the similarity label is set in the pair of the clusters C1 and C2 among the above six clusters. At this time, the above-mentioned learning support function performs relearning having a number of epochs in the relearning process smaller than a demanded number of epochs such as the number of epochs at which the value of the loss function converges or the number of epochs at which the correct answer rate of the test data reaches a fixed value, an example of which is one epoch. As a result of performing relearning having one epoch in this manner, embedding into the metric space S12 is learned in the relearning process.

Here, the above-mentioned learning support function detects a pair of clusters that come closer to each other and do not have the similarity label set, based on the embedded vectors output by the distance metric model at each of time points before relearning and in the relearning process. For example, an embedded vector EV of a cluster representative is found for each of the clusters C1 to C6. For example, as the embedded vector EV of the cluster representative, the average of the embedded vectors obtained by inputting samples belonging to the cluster to the distance metric model before relearning or in the relearning process can be used.

Using such an embedded vector of the cluster representative, the above-mentioned learning support function calculates a moving direction of the cluster. As a mere example, the moving direction of the cluster can be found by computation of subtracting the embedded vector of the cluster representative before relearning from the embedded vector of the cluster representative in the relearning process. After that, as a mere example, the above-mentioned learning support function extracts a pair of clusters in which the moving directions of the two clusters exist on a substantially the same straight line, in accordance with following formula (10). For example, in following formula (10), "delta_EV_cluster1" refers to the moving direction of the cluster C1. Furthermore, "delta_EV_cluster2" refers to the moving direction of the cluster C2. In addition, "ε1" refers to a threshold value. A pair of clusters satisfying such formula (10) is extracted.

$$1-|\cos(\mathrm{delta\_EV\_cluster1}, \mathrm{delta\_EV\_cluster2})| < \varepsilon 1 \quad (10)$$

Furthermore, the above-mentioned learning support function calculates the distance between clusters at each of time points before relearning and in the relearning process. For example, the distance between clusters can be found by computing the Euclidean distance or cosine distance of the embedded vectors of the cluster representatives for each pair of clusters. After that, the above-mentioned learning support function calculates the amount of change in the distance between clusters between before relearning and in the relearning process. For example, the amount of change between before relearning and in the relearning process can be found by computation of dividing the distance between clusters in the relearning process by the distance between clusters before relearning. A pair of clusters in which the amount of change calculated between before relearning and in the relearning process in this manner is less than a predetermined threshold value such as ε2 is extracted.

Among the pairs of clusters extracted using these ε1 and ε2, a pair of clusters in which the similarity label is not set is detected as inquiry targets that are likely to be integrated after relearning. By outputting such a pair of clusters to any output destination such as the client terminal 30, the integration suitability of the pair of clusters may be accepted.

In the case of the example illustrated in FIG. 5, the pair of the clusters C1 and C2 and the pair of the clusters C3 and C4 are narrowed down using ε1 and ε2. Among these, the pair of the clusters C1 and C2 in which the similarity label is set is excluded from the inquiry targets. On the other hand, the pair of the clusters C3 and C4 in which the similarity label is not set are detected as inquiry targets. Such a pair of the clusters C3 and C4 are output to the client terminal 30 or the like, and the integration suitability of the pair of clusters, such as stop of relearning or resetting of labels as an example, is accepted. For example, a request to stop relearning is accepted. This may suppress the integration of clusters that is not intended by the model designer. Furthermore, the dissimilarity label is set in the pair of the clusters C3 and C4, and additionally, the similarity label is set in the pair of the clusters C5 and C6. This makes it possible to adjust the environment for performing relearning while suppressing the integration of clusters that is not intended by the model designer.

After such resetting of labels, the above-mentioned learning support function performs relearning having the demanded number of epochs, based on the reset labels. For example, relearning is performed in a state in which the similarity label is set in the pair of the clusters C1 and C2, the dissimilarity label is set in the clusters C3 and C4, and additionally, the similarity label is set in the clusters C5 and C6. At this time, for the distance metric learning of the Siamese Network or the like, the distance metric model before relearning may be used, or alternatively, the distance metric model in the relearning process may be used.

As a result of performing relearning having the demanded number of epochs in this manner, the embedding into the metric space S13 is relearned. For example, in the metric space S13, the distance between the clusters C1 and C2 is made closer than the distances in the metric space S11 and the metric space S12, and additionally, the distance between the clusters C5 and C6 is made closer than the distances in the metric space S11 and the metric space S12. Furthermore, in the metric space S13, it is possible to suppress the distance between the clusters C3 and C4 becoming closer or to make the distance farther than the distance in the metric space S11 or the metric space S12.

Consequently, according to the learning support function according to the present embodiment, since the integration of the pair of clusters that is not intended by the model designer is suppressed, adversely affecting the distance metric model after relearning may be suppressed.

[6. Configuration of Server Device 10]

FIG. 1 illustrates an example of the functional configuration of the server device 10 according to the first embodiment. As illustrated in FIG. 1, the server device 10 includes a communication interface 11, a storage unit 13, and a control unit 15. Note that, while solid lines denoting relations of data exchange are illustrated in FIG. 1, only a minimum part is illustrated for convenience of explanation. For example, input and output of data relating to each processing unit are not limited to the illustrated example, and input and output of data other than those illustrated, for example, input and output of data between a processing unit and another processing unit, between a processing unit and data, and between a processing unit and an external device, may be performed.

The communication interface 11 is an interface that performs control of communication with another device, which is, for example, the client terminal 30.

As a mere example, a network interface card such as a local area network (LAN) card may be adopted for the communication interface 11. For example, the communication interface 11 accepts a label setting, a relearning execution instruction, a relearning stop instruction, or the like from the client terminal 30. In addition, the communication interface 11, for example, transmits a pair of clusters as inquiry targets as to the integration to the client terminal 30.

The storage unit 13 is a functional unit that stores data to be used in various programs including an operating system (OS) executed by the control unit 15. For example, the above programs may correspond to not only a learning support program in which the above learning support function is modularized, but also packaged software in which the learning support program is packaged in the above-mentioned classification program, and the like.

As a mere example, the storage unit 13 may correspond to an auxiliary storage device in the server device 10. For example, a hard disk drive (HDD), an optical disc, a solid state drive (SSD), or the like corresponds to the auxiliary storage device. Additionally, a flash memory such as an erasable programmable read only memory (EPROM) may also correspond to the auxiliary storage device.

The storage unit 13 stores first model data 13M1 and learning data 14 as an example of data used in the program executed by the control unit 15. In addition to these first model data 13M1 and learning data 14, data referenced by the above learning support program, examples of which include relearning conditions such as the demanded number of epochs and the number of epochs in the relearning process, may be stored in the storage unit 13.

The first model data 13M1 is data of the distance metric model before relearning. The "distance metric model before relearning" mentioned here may correspond to a distance metric model that has finished learning using learning data different from the learning data used for relearning, as a mere example. For example, as the first model data 13M1, not only the model layer structure such as neurons and synapses in each layer among the input layer, hidden layer, and output layer forming the Siamese Network, but also the model parameters such as the weight and bias of each layer are stored in the storage unit 13.

The learning data 14 is data used for relearning of the distance metric model. For example, the learning data 14 may include document data 14A and label data 14B.

The document data 14A is data of documents. The "documents" mentioned here may correspond to an example of samples input to the distance metric model. FIG. 6 is a diagram illustrating an example of the document data 14A. FIG. 6 exemplifies ten documents, namely, a document D1 to a document D10, as a mere example. In the case of the example illustrated in FIG. 6, the cluster C1 contains the documents D1 to D3. Furthermore, the cluster C2 contains the documents D4 to D6. Furthermore, the cluster C3 contains the documents D7 and D8. Furthermore, the cluster C4 contains the documents D9 and D10.

Here, FIG. 6 illustrates text data as an example of the document data 14A, but the text data is transformed to a numerical expression that can be input to the distance metric model, such as a vector expression, as preprocessing of input to the distance metric model.

As a mere example, Bag of words or the like can be used for such transformation to the numerical expression. For example, the following processing is performed for each of the documents D1 to D10.

For example, the word string of the content word is extracted from the word string of the sentence obtained by applying the morphological analysis to the text of the natural language. FIG. 7 is a diagram illustrating an example of word string extraction results. FIG. 7 illustrates the word string extraction results for each of the documents D1 to D10 illustrated in FIG. 6. For example, as illustrated in FIG. 7, function words are excluded from the word strings corresponding to the sentences of the documents D1 to D10, and additionally, particular expressions such as date and time are excluded as stop words. As a result, the word strings of the content words are extracted.

From such word strings of the content words of the documents D1 to D10, a dictionary of all the documents from the document D1 to the document D10 is generated. For example, a dictionary containing words such as "monitor", "AP server", "DB server", "failure", "error", "occur", "VEO000481436" and "VEO000481437" is generated.

After that, for each of the documents D1 to D10, "1" is allocated to the numerical value of the word included in the word string in the dictionary array, while "0" is allocated to the numerical value of the word not included in the word string, which generates the Bag of words.

For example, taking the documents D1 and D2 as an example, a vector such as {monitor: 1, AP server: 1, DB server: 0, failure: 1, error: 1, occur: 1, VEO000481436: 1, VEO000481437: 0} is obtained. In addition, taking the document D3 as an example, a vector such as {monitor: 1, AP server: 1, DB server: 0, failure: 0, error: 1, occur: 1, VEO000481436: 1, VEO000481437: 0} is obtained. Furthermore, taking the documents D4 and D5 as an example, a vector such as {monitor: 1, AP server: 0, DB server: 1, failure: 1, error: 1, occur: 1, VEO000481436: 1, VEO000481437: 0} is obtained. In addition, taking the document D6 as an example, a vector such as {monitor: 1, AP server: 0, DB server: 1, failure: 0, error: 1, occur: 1, VEO000481436: 1, VEO000481437: 0} is obtained. Furthermore, taking the documents D7 and D8 as an example, a vector such as {monitor: 1, AP server: 1, DB server: 0, failure: 1, error: 1, occur: 1, VEO000481436: 0, VEO000481437: 1} is obtained. In addition, taking the documents D9 and D10 as an example, a vector such as {monitor: 1, AP server: 0, DB server: 1, failure: 1, error: 1, occur: 1, VEO000481436: 0, VEO000481437: 1} is obtained.

The eight-dimensional vectors of the documents D1 to D10 obtained by such preprocessing may be input to the distance metric model. Hereinafter, when the vectors of the documents D1 to D10 can be generically referred to without distinction from each other, the vectors of the documents D1 to D10 will be described as "document vectors" in some cases.

The label data 14B is data relating to labels set in pairs of clusters.

Figure 8:
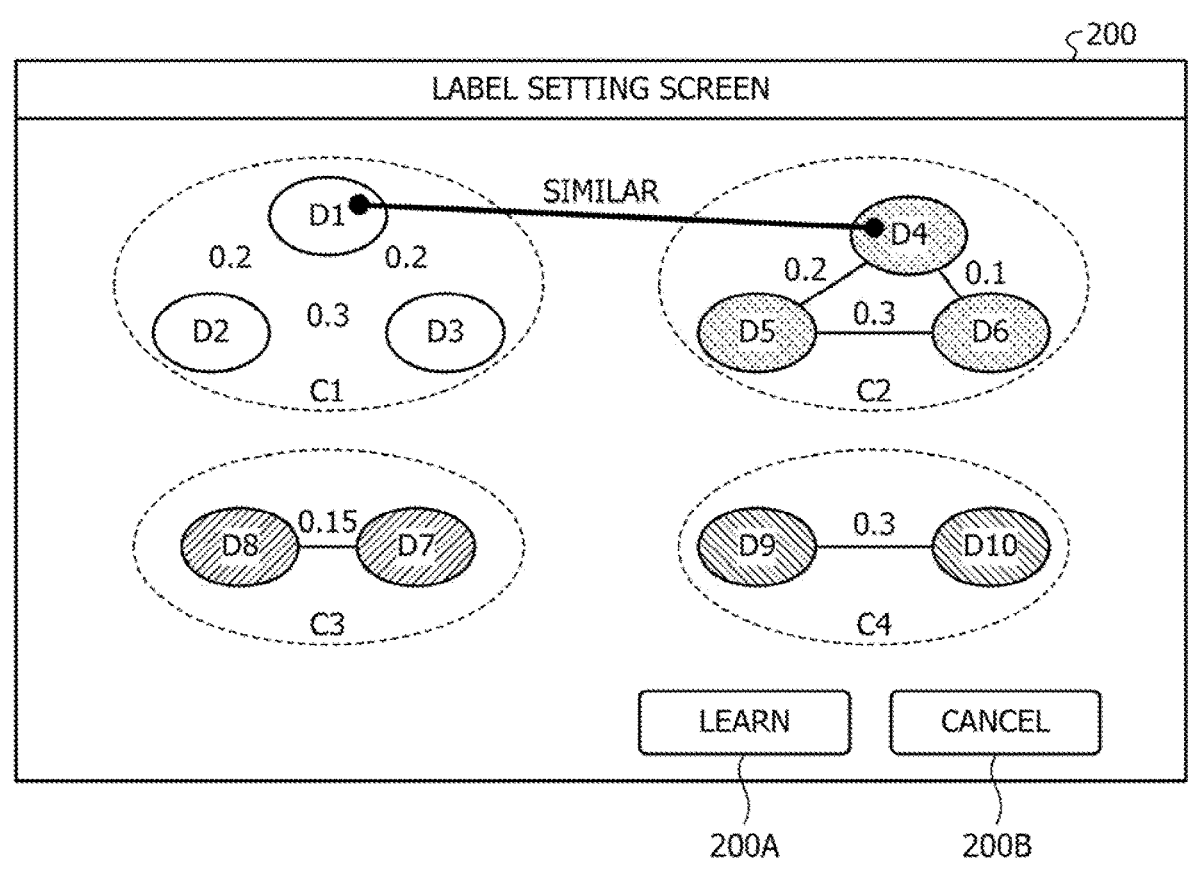
FIG. 8 is a diagram illustrating an example of a label setting screen.

For example, the label data 14B may be generated by accepting a label setting from the client terminal 30. As a mere example, the label setting can be accepted via a label setting screen 200 illustrated in FIG. 8. FIG. 8 is a diagram illustrating an example of the label setting screen 200. In FIG. 8, a clustering result of the embedded vectors obtained by inputting the vectors of the documents D1 to D10 to the distance metric model before relearning is displayed on the label setting screen 200. For example, as illustrated in FIG. 8, the clusters C1 to C4 are displayed on the label setting screen 200. Among these, the cluster C1 contains the documents D1 to D3. Furthermore, the cluster C2 contains the documents D4 to D6. Furthermore, the cluster C3 contains the documents D7 and D8. Furthermore, the cluster C4 contains the documents D9 and D10. Along with displaying these clusters C1 to C4, the label setting screen 200 displays the distances of the embedded vectors between the documents in the cluster.

An operation of assigning the similarity label to a pair of clusters is accepted on such a label setting screen 200. As a mere example, when a pointing device such as a mouse is used as an input device, the similarity label can be set in a pair of documents by a drag-and-drop operation. For example, in the case of the example illustrated in FIG. 8, an example of setting the similarity label in the pair of the clusters C1 and C2 by dragging the document D1 belonging to the cluster C1 to drop the dragged document D1 onto the document D4 belonging to the cluster C2 is illustrated on the label setting screen 200.

The label set in the pair of clusters in this manner is saved as the label data 14B. Note that, although an example of setting a label by regarding the designated pair of documents as a pair of clusters is given here, the designated pair of documents does not necessarily have to be regarded as a pair of clusters, and a label may be set in a pair of documents. In addition, as an example of the label setting, an example of accepting the setting of the similarity label is given here, but as a matter of course, the setting of the dissimilarity label may also be accepted. Furthermore, an example of accepting the label setting by user operation is given here, but if the label setting can also be acquired via the network NW, the label setting may be acquired from an internal or external storage including a removable disk and the like.

The control unit 15 is a functional unit that performs overall control of the server device 10.

As one embodiment, the control unit 15 may be implemented by a hardware processor such as a central processing unit (CPU) or a micro-processing unit (MPU). While a CPU and an MPU are exemplified as an example of the processor here, it may be implemented by any processor regardless of whether it is a versatile type or a specialized type. Additionally, the control unit 15 may also be achieved by a hard wired logic such as an application specific integrated circuit (ASIC) or a field programmable gate array (FPGA).

By executing the learning support program described above, the control unit 15 virtually achieves the processing units illustrated in FIG. 1 on a work area of a random access memory (RAM) such as a dynamic random access memory (DRAM) implemented as a main storage device (not illustrated). Note that an example of executing the learning support program in which the above-described learning support function is modularized is given here, but the program running on the server device 10 is not limited to this. For example, packaged software in which the learning support program is packaged in the above-mentioned classification program may be executed.

For example, as illustrated in FIG. 1, the control unit 15 includes an acceptance unit 15A, a first calculation unit 15B, a learning unit 15C, a second calculation unit 15D, a third calculation unit 15E, and a detection unit 15F.

The acceptance unit 15A is a processing unit that accepts a request for relearning.

As one embodiment, the acceptance unit 15A accepts a request for relearning such as fine-tune, by accepting a pressing operation on a learn button 200A arranged on the label setting screen 200 illustrated in FIG. 8 from the client terminal 30. Then, when a request for relearning is accepted, the acceptance unit 15A reads the first model data 13M1 and the learning data 14 from the storage unit 13.

The first calculation unit 15B is a processing unit that calculates the embedded vector before relearning.

As one embodiment, the first calculation unit 15B performs first distance metric processing that calculates the embedded vector of the representative of each cluster of the learning data 14, using the distance metric model before relearning. For example, the first calculation unit 15B inputs the vector of each sample of the learning data 14 to the distance metric model before relearning loaded into a work area of a memory (not illustrated) in accordance with the first model data 13M1 read from the storage unit 13. This causes the distance metric model before relearning to output the embedded vector.

For example, for each of the clusters C1 to C4, the document vector that is a sample specified as the representative of the cluster is input to the input layer of the distance metric model before relearning. Here, the distance metric model is assumed to have "eight" input layers, which is the number of words in the documents D1 to D10, and two output layers. Furthermore, the samples specified as the representatives of the respective clusters C1 to C4 of the learning data are individually assumed as the document D1, the document D4, the document D7, and the document D9. For example, in the case of the cluster C1, the vector of the document D1 {monitor: 1, AP server: 1, DB server: 0, failure: 1, error: 1, occur: 1, VEO000481436: 1, VEO000481437: 0} is input to the input layer of the distance metric model before relearning. As a result, the output layers of the distance metric model before relearning output the embedded vector [−5, −5] of the document D1 before relearning. Similarly, by inputting the vector of the document D4 to the distance metric model before relearning, the embedded vector [−5, 5] of the document D4 before relearning is obtained. Similarly, by inputting the vector of the document D7 to the distance metric model before relearning, the embedded vector [5, 3] of the document D7 before relearning is obtained. Similarly, by inputting the vector of the document D9 to the distance metric model before relearning, the embedded vector [5, −3] of the document D9 before relearning is obtained.

The input and output in the above first distance metric processing are as follows.

Input:

D1, D2={Monitor: 1, AP Server: 1, DB Server: 0, Failure: 1, Error: 1, Occur: 1, VEO000481436: 1, VEO000481437: 0}

D3={Monitor: 1, AP Server: 1, DB Server: 0, Failure: 0, Error: 1, Occur: 1, VEO000481436: 1, VEO000481437: 0}

D4, D5={Monitor: 1, AP Server: 0, DB Server: 1, Failure: 1, Error: 1, Occur: 1, VEO000481436: 1, VEO000481437: 0}

D6={Monitor: 1, AP Server: 0, DB Server: 1, Failure: 0, Error: 1, Occur: 1, VEO000481436: 1, VEO000481437: 0}

D7, D8={Monitor: 1, AP Server: 1, DB Server: 0, Failure: 1, Error: 1, Occur: 1, VEO000481436: 0, VEO000481437: 1}

D9, D10={Monitor: 1, AP Server: 0, DB Server: 1, Failure: 1, Error: 1, Occur: 1, VEO000481436: 0, VEO000481437: 1}

Output: "=" means generation in the distance metric model before relearning

D1_before_fine_tune=[−5, −5]
  D4_before_fine_tune=[−5, 5]
  D7_before_fine_tune=[5, 3]
  D9_before_fine_tune=[5, −3]

Figure 9:
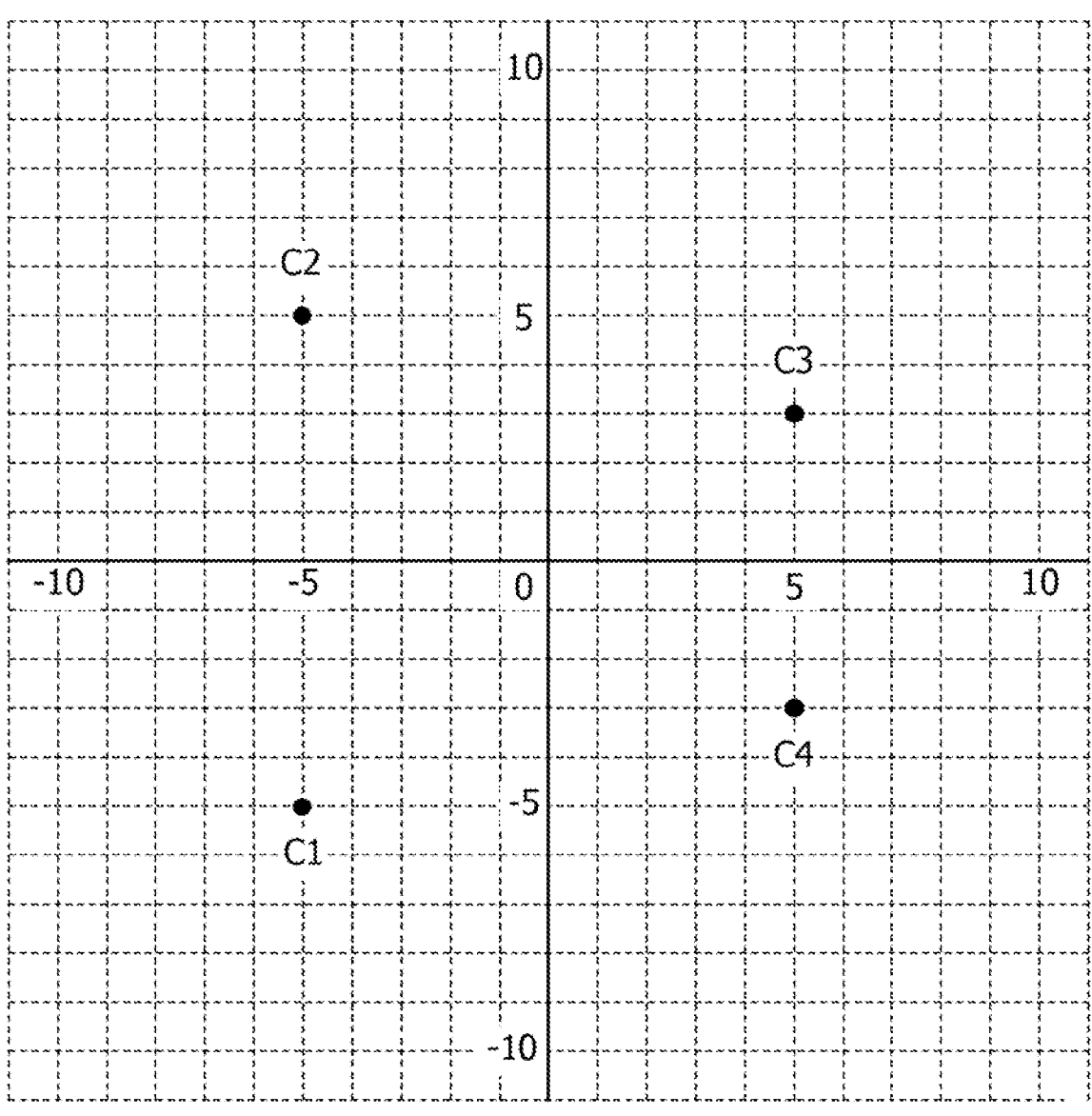
FIG. 9 is a diagram illustrating an example of embedded vectors.

FIG. 9 is a diagram illustrating an example of the embedded vectors. In FIG. 9, the embedded vectors of the documents D1, D4, D7, and D9, which are specified as the representatives of the clusters C1 to C4 embedded by the distance metric model before relearning, are mapped. As illustrated in FIG. 9, before relearning, the document D1 specified as the representative of the cluster C1 is embedded in [−5, −5], and additionally, the document D4 specified as the representative of the cluster C2 is embedded in [−5, 5]. Furthermore, the document D7 specified as the representative of the cluster C3 is embedded in [5, 3], and additionally, the document D9 specified as the representative of the cluster C4 is embedded in [5, −3].

The learning unit 15C is a processing unit that performs relearning of the distance metric model that has finished learning.

As one embodiment, the learning unit 15C uses the learning data 14 to perform distance metric learning of the distance metric model defined by the first model data 13M1, which is relearning. For example, the learning unit 15C performs the following processing for each pair of documents obtained by combining two of the documents D1 to D10. For example, the learning unit 15C relearns parameters of the Siamese Network that bring the distance between a similar pair closer while bringing the distance between a dissimilar pair farther, based on the similarity or dissimilarity label set in the pair of documents. Here, as a mere example, the learning unit 15C is assumed to use the similarity label set in the pair of the clusters C1 and C2 to update the parameters of the Siamese Network. When the label is set in the pair of clusters in this manner, relearning is performed by regarding that the same label, which is the similarity label, is set for all combinations among documents belonging to each cluster. For example, the above combinations may include a pair of the documents D1 and D4, a pair of the documents D1 and D5, and a pair of the documents D1 and D6. Furthermore, the above combinations may include a pair of the documents D2 and D4, a pair of the documents D2 and D5, and a pair of the documents D2 and D6. Furthermore, the above combinations may include a pair of the documents D3 and D4, a pair of the documents D3 and D5, and a pair of the documents D3 and D6.

Here, the learning unit 15C is not restricted to repeat relearning using the learning data 14 until the demanded number of epochs such as the number of epochs at which the value of the loss function converges or the number of epochs at which the correct answer rate of the test data reaches a fixed value. For example, the learning unit 15C performs relearning having a number of epochs in the relearning process smaller than the demanded number of epochs, such as one epoch.

The input and output in the above distance metric learning processing are as follows.

Input:

Siamese Network that Has Finished Learning

Number of Epochs: One

Learning Data:

Similar Pairs: (D1, D4), (D1, D5), (D1, D6), (D2, D4), (D2, D5), (D2, D6), (D3, D4), (D3, D5), (D3, D6)

Output:

Siamese Network in Relearning Process

The parameters and the like of the distance metric model in the relearning process obtained by relearning of the learning unit 15C in this manner are stored as second model data 13M2 in a work area of the memory referenced by the control unit 15. Note that an example in which the second model data 13M2 is stored in the memory referenced by the control unit 15 is given here, but as a matter of course, the second model data 13M2 may be saved in any storage such as a storage area included in the storage unit 13.

The second calculation unit 15D is a processing unit that calculates the embedded vector in the relearning process.

As one embodiment, the second calculation unit 15D performs second distance metric processing that calculates the embedded vector of the representative of each cluster of the learning data 14, using the distance metric model in the relearning process. For example, the second calculation unit 15D inputs the vector of each sample of the learning data 14 to the distance metric model in the relearning process loaded into a work area of a memory (not illustrated) in accordance with the second model data 13M2 described above. This causes the distance metric model in the relearning process to output the embedded vector.

For example, for each of the clusters C1 to C4, the document vector that is a sample specified as the representative of the cluster is input to the input layer of the distance metric model in the relearning process. Here, as a mere example, it is assumed that the parameters of the distance metric model are different but the layer structure is common between before relearning and in the relearning process. For example, in the case of the cluster C1, the vector of the document D1. {monitor: 1, AP server: 1, DB server: 0, failure: 1, error: 1, occur: 1, VEO000481436: 1, VEO000481437: 0} is input to the input layer of the distance metric model in the relearning process. As a result, the output layers of the distance metric model in the relearning process output the embedded vector [−5, −4] of the document D1 in the relearning process. Similarly, by inputting the vector of the document D4 to the distance metric model in the relearning process, the embedded vector [−5, 4] of the document D4 in the relearning process is obtained. Similarly, by inputting the vector of the document D7 to the distance metric model in the relearning process, the embedded vector [5, 2] of the document D7 in the relearning process is obtained. Similarly, by inputting the vector of the document D9 to the distance metric model in the relearning process, the embedded vector [5, −2] of the document D9 in the relearning process is obtained.

The input and output in the above second distance metric processing are as follows.

Input:

D1={Monitor: 1, AP Server: 1, DB Server: 0, Failure: 1, Error: 1, Occur: 1, VEO000481436: 1, VEO000481437: 0}

D4={Monitor: 1, AP Server: 0, DB Server: 1, Failure: 1, Error: 1, Occur: 1, VEO000481436: 1, VEO000481437: 0}

D7={Monitor: 1, AP Server: 1, DB Server: 0, Failure: 1, Error: 1, Occur: 1, VEO000481436: 0, VEO000481437: 1}

D9={Monitor: 1, AP Server: 0, DB Server: 1, Failure: 1, Error: 1, Occur: 1, VEO000481436: 0, VEO000481437: 1}

Output:

D1_process_of_fine_tune=[−5, −4]

D4_process_of_fine_tune=[−5, 4]

D7_process_of_fine_tune=[5, 2]

D9_process_of_fine_tune=[5, −2]

Figure 10:
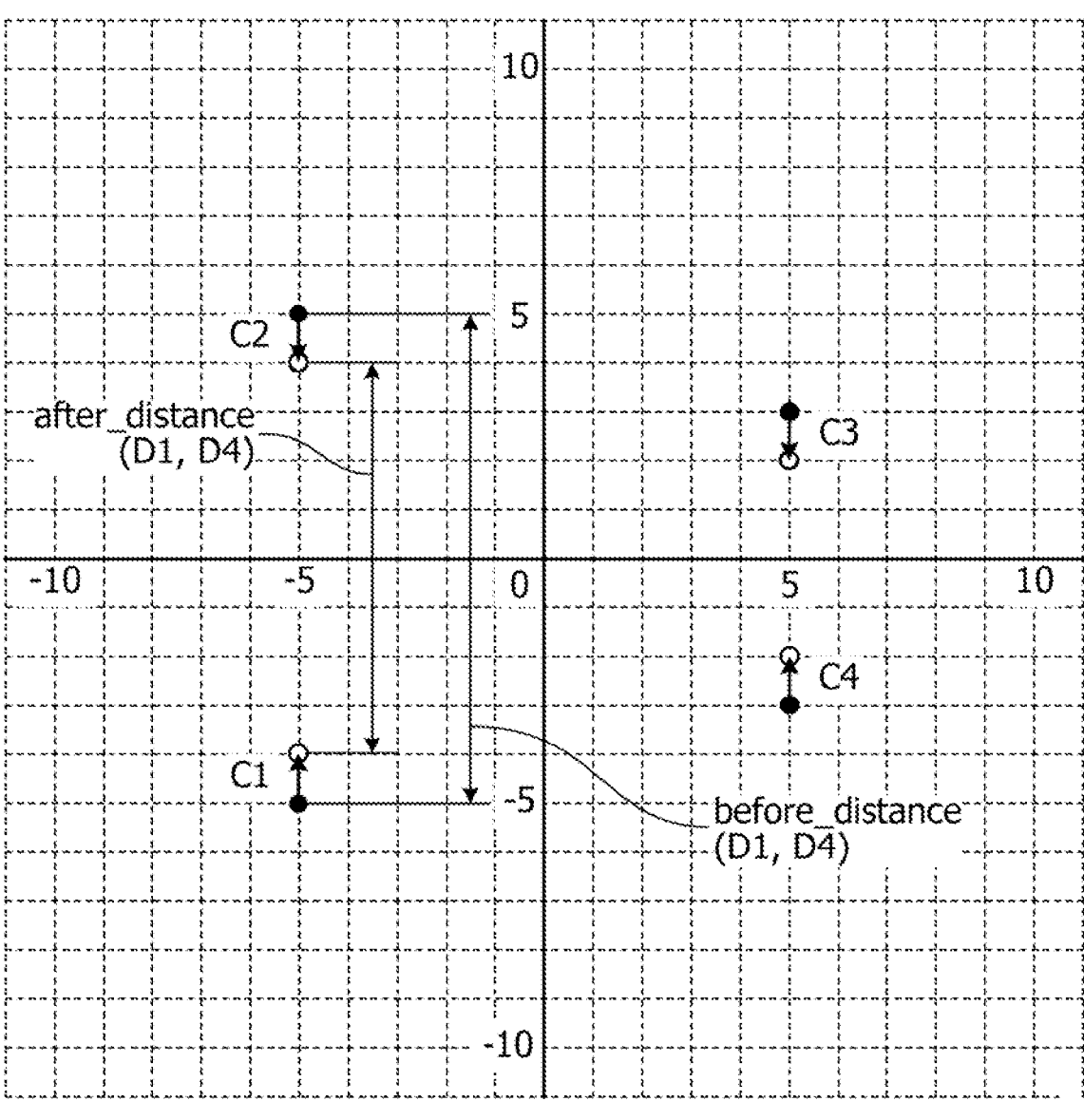
FIG. 10 is a diagram illustrating an example of the embedded vectors.

FIG. 10 is a diagram illustrating an example of the embedded vectors. In FIG. 10, the embedded vectors of the documents D1, D4, D7, and D9, which are specified as the representatives of the clusters C1 to C4 embedded by the distance metric model before relearning, are mapped by black circles. Furthermore, in FIG. 10, the embedded vectors of the documents D1, D4, D7, and D9, which are specified as the representatives of the clusters C1 to C4 embedded by the distance metric model in the relearning process, are mapped by white circles. As illustrated in FIG. 10, the document D1 specified as the representative of the cluster C1 is embedded in [−5, −5] before relearning, while it is embedded in [−5, −4] in the relearning process. Furthermore, the document D4 specified as the representative of the cluster C2 is embedded in [−5, 5] before relearning, while it is embedded in [−5, 4] in the relearning process. Furthermore, the document D7 specified as the representative of the cluster C3 is embedded in [5, 3] before relearning, while it is embedded in [5, 2] in the relearning process. Furthermore, the document D9 specified as the representative of the cluster C4 is embedded in [5, −3] before relearning, while it is embedded in [5, −2] in the relearning process.

The third calculation unit 15E is a processing unit that calculates a movement parameter between clusters between before relearning and in the relearning process.

As one aspect, the third calculation unit 15E calculates the moving direction of the cluster by computation of subtracting the embedded vector of the cluster representative before relearning from the embedded vector of the cluster representative in the relearning process. The input and output when the moving direction of the cluster is calculated in this manner are as follows.

Input:

D1_before_fine_tune=[−5, −5]

D4_before_fine_tune=[−5, 5]

D7_before_fine_tune=[5, 3]

D9_before_fine_tune=[5, −3]

D1_process_of_fine_tune=[−5, −4]

D4_process_of_fine_tune=[−5, 4]

D7_process_of_fine_tune=[5, 2]

D9_process_of_fine_tune=[5, −2]

Output:

D1_delta=[0, 1]

D4_delta=[0, −1]

D7_delta=[0, −1]

D9_delta=[0, 1]

Based on the above moving direction of the cluster, the third calculation unit 15E calculates the magnitude of a travel angle between the clusters. The input and output when the travel angle between clusters is calculated in this manner are as follows.

Input:

D1_delta=[0, 1]

D4_delta=[0, −1]

D7_delta=[0, −1]

D9_delta=[0, 1]

Output:

Regarding Pair of Document D1 as Representative of Cluster C1 and Document D4 as Representative of Cluster C2

1−|Cos(D1_delta, D4_delta)|=0

Regarding Pair of Document D1 as Representative of Cluster C1 and Document D7 as Representative of Cluster C3

1−|Cos(D1_delta, D7_delta)|=0

Regarding Pair of Document D1 as Representative of Cluster C1 and Document D9 as Representative of Cluster C4

1−|Cos(D1_delta, D9_delta)|=0

Regarding Pair of Document D4 as Representative of Cluster C2 and Document D7 as Representative of Cluster C3

1−|Cos(D4_delta, D7_delta)|=0

Regarding Pair of Document D4 as Representative of Cluster C2 and Document D9 as Representative of Cluster C4

1−|Cos(D4_delta, D9_delta)|=0

Regarding Pair of Document D7 as Representative of Cluster C3 and Document D9 as Representative of Cluster C4

1−|Cos(D7_delta, D9_delta)|=0

As another aspect, the third calculation unit 15E calculates the amount of change in the distance between clusters, based on the embedded vectors of the cluster representatives in the relearning process and the embedded vectors of the cluster representatives before relearning. As a mere example, the amount of change between before relearning and in the relearning process can be found by computation of dividing the distance between clusters in the relearning process by the distance between clusters before relearning. The input and output when the amount of change in the distance between clusters is calculated in this manner are as follows.

Input:

D1_before_fine_tune=[−5, −5]

D4_before_fine_tune=[−5, 5]

D7_before_fine_tune=[5, 3]

D9_before_fine_tune=[5, −3]

D1_process_of_fine_tune=[−5, −4]

D4_process_of_fine_tune=[−5, 4]

D7_process_of_fine_tune=[5, 2]

D9_process_of_fine_tune=[5, −2]

Output:

Regarding Pair of Document D1 as Representative of Cluster C1 and Document D4 as Representative of Cluster C2 after_distance(D1, D4)/before_distance(D1, D4)=8/10=0.8

Regarding Pair of Document D1 as Representative of Cluster C1 and Document D7 as Representative of Cluster C3 after_distance(D1, D7)/before_distance(D1, D7)=√136/√164≈0.91

Regarding Pair of Document D1 as Representative of Cluster C1 and Document D9 as Representative of Cluster C4 after_distance(D1, D9)/before_distance(D1, D9)=√104/√104=1

Regarding Pair of Document D4 as Representative of Cluster C2 and Document D7 as Representative of Cluster C3 after_distance(D4, D7)/before_distance(D4, D7)=√104/√104=1

Regarding Pair of Document D4 as Representative of Cluster C2 and Document D9 as Representative of Cluster C4 after_distance(D4, D9)/before_distance(D4, D9)=√136/√164≈0.91

Regarding Pair of Document D7 as Representative of Cluster C3 and Document D9 as Representative of Cluster C4 after_distance(D7, D9)/before_distance(D7, D9)=4/6≈0.67

The above "before_distance" refers to the distance between clusters before relearning, and furthermore, the above "after_distance" refers to the distance between clusters in the relearning process. To give a mere example, "before_distance (D1, D4)" refers to the distance (=10) between the clusters C1 and C2 before relearning. In addition, "after_distance (D1, D4)" refers to the distance (=8) between the clusters C1 and C2 in the relearning process, as illustrated in FIG. 10.

The detection unit 15F is a processing unit that detects a pair of clusters that are likely to be integrated after relearning. Hereinafter, a pair of clusters that are likely to be integrated after relearning will be described as an "integrated cluster pair" in some cases. Note that the detection unit 15F may correspond to an example of an output unit.

As one embodiment, the detection unit 15F detects the integrated cluster pair based on at least one or a combination of the magnitude of the travel angle between clusters calculated by the third calculation unit 15E and the amount of change in the distance between clusters calculated by the third calculation unit 15E.

As a mere example, the detection unit 15F can detect the integrated cluster pair under an AND condition between the magnitude of the travel angle between clusters and the amount of change in the distance between clusters. For example, the detection unit 15F detects, as the integrated cluster pair, a pair of clusters in which the magnitude of the travel angle between clusters is less than the predetermined threshold value ε1 and the amount of change in the distance between clusters is less than the predetermined threshold value ε2. Here, when ε1 is assumed as 0.01 and ε2 is assumed as 0.9, the pair of the clusters C1 and C2 and the pair of the clusters C3 and C4 are detected as the integrated cluster pairs. In addition, when ε1 is assumed as 0.01 and ε2 is assumed as 0.95, the pair of the clusters C1 and C2, the pair of the clusters C1 and C3, the pair of the clusters C2 and C4, and the pair of the clusters C3 and C4 are detected as the integrated cluster pairs.

Furthermore, from the aspect of excluding a pair of clusters that are to be integrated as the model designer has intended, the detection unit 15F excludes a pair of clusters in which the similarity label is set, among pairs of clusters detected as the integrated cluster pairs, from the target for inquiry. For example, in the case of the example of the label setting screen 200 illustrated in FIG. 8, since the similarity label is set in the pair of the clusters C1 and C2 in the label data 14B, the pair of the clusters C1 and C2 is excluded, and the pair of the clusters C3 and C4 is extracted.

Figure 11:
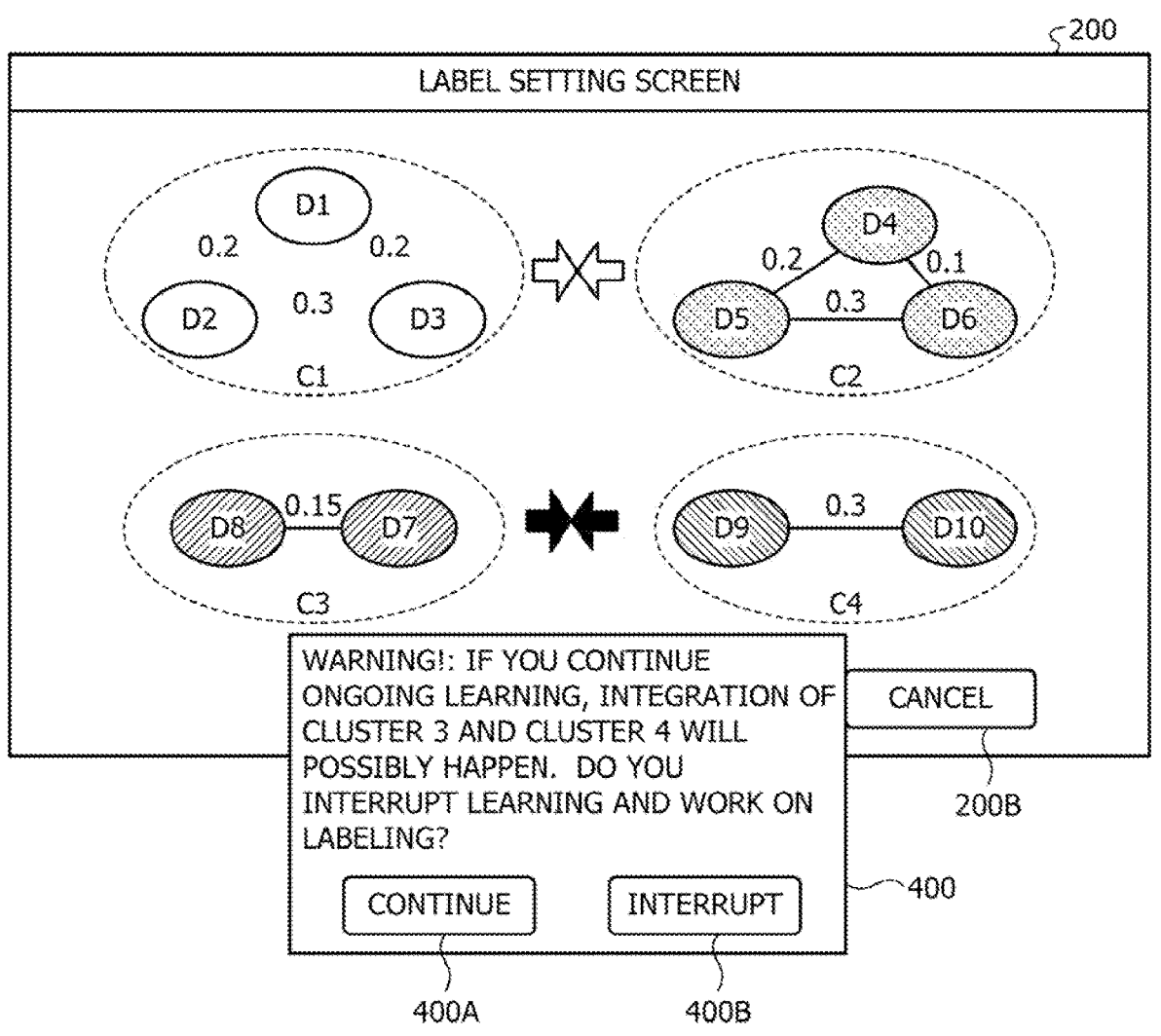
FIG. 11 is a diagram illustrating an example of an inquiry screen.

The integrated cluster pair detected as the inquiry targets in this manner may be output to a predetermined output destination such as the client terminal 30. FIG. 11 is a diagram illustrating an example of an inquiry screen. As a mere example, FIG. 11 illustrates an example in which an inquiry screen 400 including the integrated cluster pair detected as the inquiry targets is displayed in a pop-up manner in front of the label setting screen 200. As illustrated in FIG. 11, in addition to displaying a message warning that there is a possibility that the pair of the clusters C3 and C4 would be integrated after relearning, the inquiry screen 400 displays a continue button 400A and an interrupt button 400B. For example, when an operation on the continue button 400A is accepted, relearning is continued by the learning unit 15C with the above label data 14B set, up to the demanded number of epochs without interrupting relearning in the relearning process. On the other hand, when an operation on the interrupt button 400B is accepted, relearning can be interrupted in the relearning process. In addition to such interruption, the label can be reset on the label setting screen.

Figure 12:
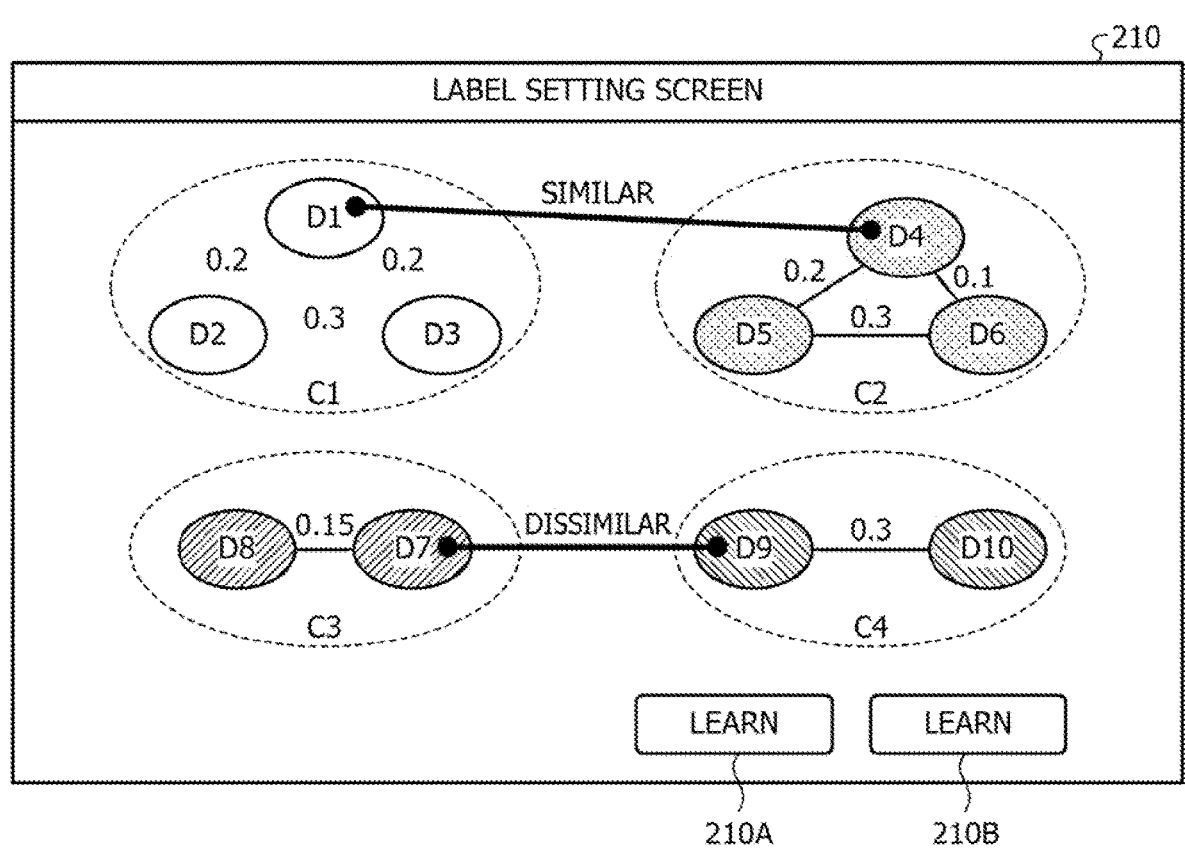
FIG. 12 is a diagram illustrating an example of the label setting screen.

FIG. 12 is a diagram illustrating an example of the label setting screen. FIG. 12 illustrates a label setting screen 210 displayed after the interrupt button 400B of the inquiry screen 400 illustrated in FIG. 11 is operated. Resetting of the similarity or dissimilarity label can be accepted through an operation of associating a pair of documents on the label setting screen 210 illustrated in FIG. 12. For example, in the case of the example of the label setting screen 210 illustrated in FIG. 12, an example of setting the dissimilarity label in the pair of the clusters C3 and C4 by dragging the document D7 belonging to the cluster C3 to drop the dragged document D7 onto the document D9 belonging to the cluster C4 is illustrated. The label reset in the pair of clusters in this manner is overwritten and saved in the label data 14B. Thereafter, when an operation on a learn button 210A is accepted, the learning unit 15C can be caused to execute relearning based on the reset label. Note that, when an operation on a cancel button 210B is accepted, relearning is canceled.

As one aspect, by outputting the integrated cluster pair in which the similarity label is not set, the following behavior may be expected.

For example, the label setting screen 200 illustrated in FIG. 8 illustrates an example in which the similarity label is set in the pair of the clusters C1 and C2 with the intention of integrating the clusters C1 and C2. Such label setting diminishes the importance, in cluster formation, of the words "AP server" appearing in the documents D1 to D3 and the words "DB server" appearing in the documents D4 to D6. Along with this, the importance of "VEO000481436" and "VEO000481437" will increase in embedding into the metric space. From these facts, the possibility that the integration of the pair of the clusters C1 and C2 occurs due to the label setting in the pair of the clusters C1 and C2 increases.

In this manner, by outputting the integrated cluster pair in which the similarity label is not set in a context in which the integration of the pair of the clusters C1 and C2 occurs, an inquiry about the suitability of the integration of clusters that is not intended by the model designer, such as stop of relearning or resetting of labels as an example, is achieved. This may suppress the integration of clusters that is not intended by the model designer. Furthermore, by accepting resetting such as setting the dissimilarity label in the pair of the clusters C3 and C4, relearning as intended by the model designer may be performed.

Note that, although an example in which the setting of the dissimilarity label in the pair of the clusters C3 and C4 is manually accepted is given here, a recommendation to set the dissimilarity label in the integrated cluster pair in which the similarity label is not set may be output automatically.

[7. Processing Flow]

Figure 13:
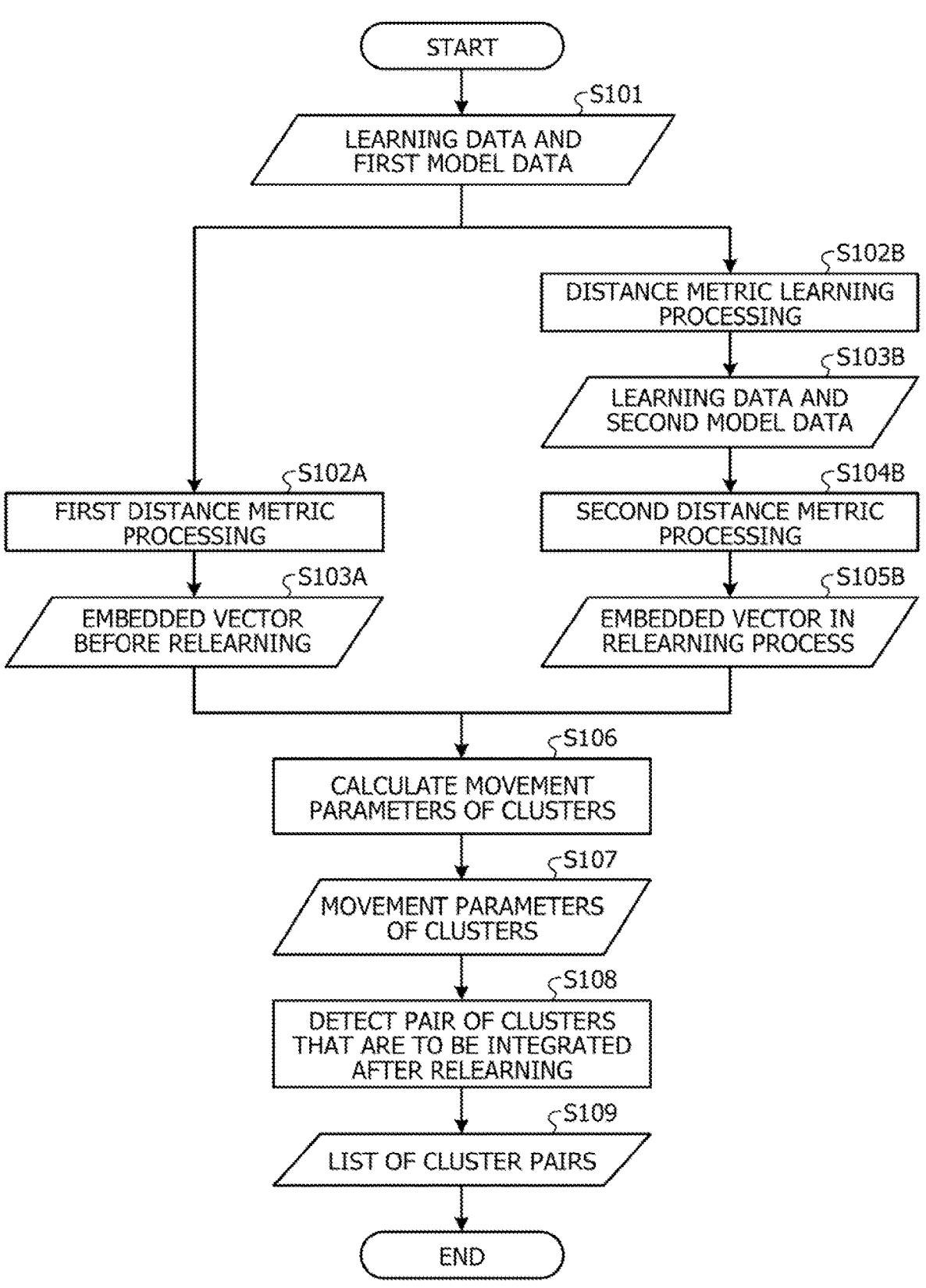
FIG. 13 is a flowchart illustrating a procedure of training support processing according to the first embodiment.

FIG. 13 is a flowchart illustrating a procedure of learning support processing according to the first embodiment. As a mere example, this processing is started when a request for relearning is accepted, or the like. As illustrated in FIG. 13, the acceptance unit 15A reads the first model data 13M1 and the learning data 14 from the storage unit 13 (step S101).

Subsequently, the first calculation unit 15B performs the first distance metric processing that calculates the embedded vector of the representative of each cluster of the learning data 14, using the distance metric model before relearning defined in the first model data 13M1 (step S102A). The embedded vector of the cluster representative before relearning calculated in step S102A is output to the third calculation unit 15E from the first calculation unit 15B (step S103A).

In parallel with above step S102A and above step S103A, processing in following step S102B to following step S105B is executed.

In step S102B, the learning unit 15C uses the learning data 14 to perform distance metric learning of the distance metric model defined by the first model data 13M1, which is relearning. Here, as the number of times the learning data 14 is relearned, the number of epochs in the relearning process, which is smaller than the demanded number of epochs, is applied. As a result of step S102B, the parameters and the like of the distance metric model in the relearning process are output to the second calculation unit 15D from the learning unit 15C as the second model data 13M2 (step S103B).

Subsequently, the second calculation unit 15D performs the second distance metric processing that calculates the embedded vector of the representative of each cluster of the learning data 14, using the distance metric model in the relearning process defined in the second model data 13M2 (step S104B). The embedded vector of the cluster representative in the relearning process calculated in step S104B is output to the third calculation unit 15E from the second calculation unit 15D (step S105B).

Thereafter, the third calculation unit 15E calculates the movement parameters between clusters, such as the magnitude of the travel angle between clusters and the amount of change in the distance between clusters, based on the embedded vectors of the cluster representatives before relearning and the embedded vectors of the cluster representatives in the relearning process (step S106). The movement parameters between clusters calculated in step S106 are output to the detection unit 15F from the third calculation unit 15E (step S107).

Then, the detection unit 15F detects a pair of clusters that are likely to be integrated after relearning, based on at least one or a combination of the magnitude of the travel angle between clusters and the amount of change in the distance between clusters (step S108). Among the pairs of clusters detected in step S108, a pair of cluster in which the similarity label is not set is output to a predetermined output destination such as the client terminal 30 as an example (step S109).

[8. One Aspect of Effects]

As described above, the server device 10 according to the present embodiment provides the learning support function that detects a pair of clusters that come closer to each other and do not have the similarity label set, based on the embedded vectors output by the distance metric model at each of time points before relearning and in the relearning process. Consequently, according to the server device 10 according to the present embodiment, since the integration of the pair of clusters that is not intended by the model designer is suppressed, adversely affecting the distance metric model after relearning may be suppressed.

Second Embodiment

While the embodiments relating to the disclosed device have been described above, the embodiments may be carried out in a variety of different modes in addition to the embodiments described above. Thus, hereinafter, another embodiment included in the embodiments will be described.

[Distribution and Integration]

In addition, each of the illustrated constituent elements in each of the devices does not necessarily have to be physically configured as illustrated in the drawings. For example, specific modes of distribution and integration of the individual devices are not restricted to those illustrated, and all or some of the devices may be configured by being functionally or physically distributed and integrated in any unit depending on various loads, usage status, and the like. For example, the acceptance unit 15A, the first calculation unit 15B, the learning unit 15C, the second calculation unit 15D, the third calculation unit 15E, or the detection unit 15F may be connected by way of a network as an external device of the server device 10. In addition, different devices each may include the acceptance unit 15A, the first calculation unit 15B, the learning unit 15C, the second calculation unit 15D, the third calculation unit 15E, or the detection unit 15F and may be connected to a network to cooperate with each other, whereby the above-described function of the server device 10 may be achieved.

[Learning Support Program]

In addition, various kinds of processing described in the embodiments above may be achieved by a computer such as a personal computer or a workstation executing a program prepared in advance. Thus, in the following, an example of a computer that executes the learning support program according to the first and second embodiments will be described with reference to FIG. 14.

Figure 14:
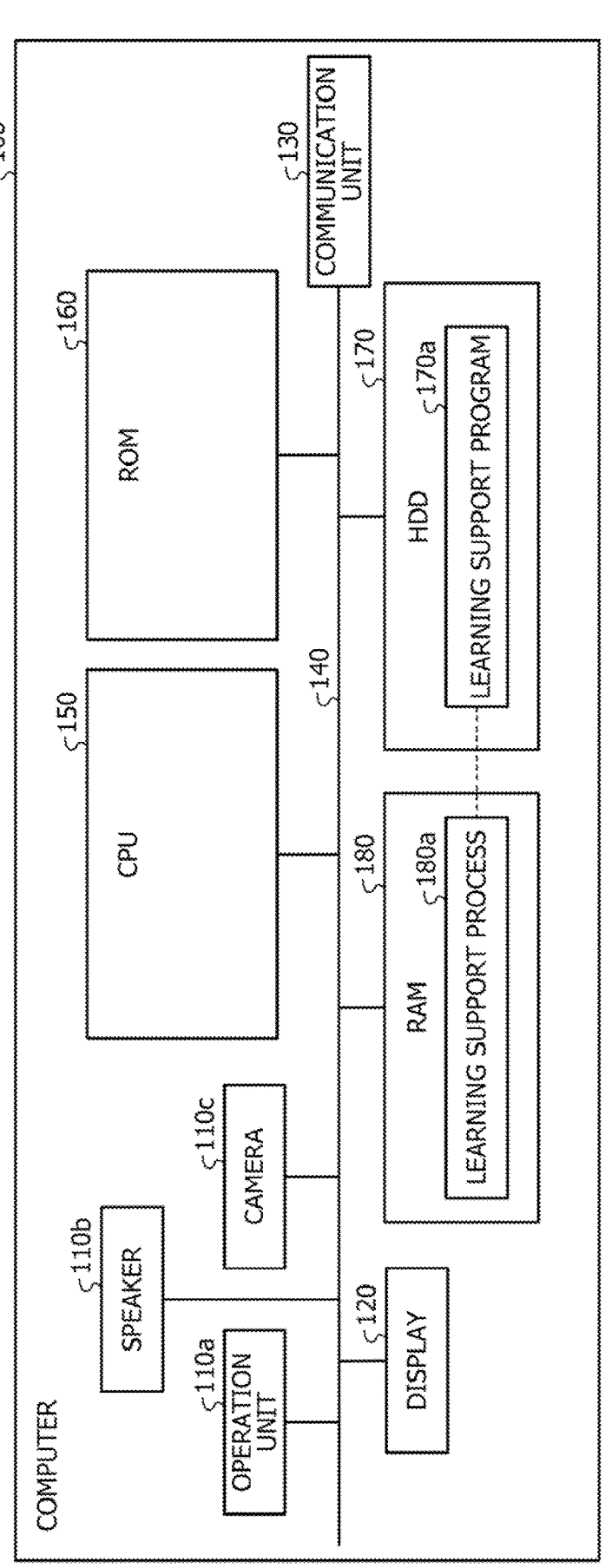
FIG. 14 is a diagram illustrating a hardware configuration example of a computer.

FIG. 14 is a diagram illustrating a hardware configuration example of a computer. As illustrated in FIG. 14, a computer 100 includes an operation unit 110a, a speaker 110b, a camera 110c, a display 120, and a communication unit 130. Furthermore, the computer 100 includes a CPU 150, a read-only memory (ROM) 160, an HDD 170, and a RAM 180. These units 110 to 180 are each connected via a bus 140.

As illustrated in FIG. 14, the HDD 170 stores a learning support program 170a that has functions similar to the functions of the acceptance unit 15A, the first calculation unit 15B, the learning unit 15C, the second calculation unit 15D, the third calculation unit 15E, and the detection unit 15F indicated in the above first embodiment. This learning support program 170a may be integrated or separated in a similar manner to the respective constituent elements of the acceptance unit 15A, the first calculation unit 15B, the learning unit 15C, the second calculation unit 15D, the third calculation unit 15E, and the detection unit 15F illustrated in FIG. 1. For example, all the data indicated in the first embodiment described above does not necessarily have to be stored in the HDD 170, and it is sufficient if only data for use in processing is stored in the HDD 170.

Under such an environment, the CPU 150 reads the learning support program 170a from the HDD 170 and then loads the read learning support program 170a into the RAM 180. As a result, the learning support program 170a functions as a learning support process 180a as illustrated in FIG. 14. This learning support process 180a loads various kinds of data read from the HDD 170 into an area allocated to the learning support process 180a in a storage area included in the RAM 180 and executes various kinds of processing using this various kinds of loaded data. For example, examples of the processing to be executed by the learning support process 180a include the processing illustrated in FIG. 13 and the like. Note that all the processing units indicated in the first embodiment described above do not necessarily have to run on the CPU 150, and it is sufficient if only a processing unit corresponding to processing to be executed is virtually achieved.

Note that the learning support program 170a described above does not necessarily have to be stored in the HDD 170 or the ROM 160 from the beginning. For example, each program may be stored in a "portable physical medium" such as a flexible disk, which is what is called an FD, a compact disc read only memory (CD-ROM), a digital versatile disc (DVD), a magneto-optical disk, or an integrated circuit (IC) card to be inserted into the computer 100. Then, the computer 100 may acquire and execute each program from these portable physical media. Furthermore, each program may be stored in another computer, server device, or the like connected to the computer 100 via a public line, the Internet, a LAN, a wide area network (WAN), or the like, and the computer 100 may acquire each program from them to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a training support program for causing a computer to execute a process comprising:

calculating a first embedded vector for each of clusters obtained by clustering samples included in training data, by inputting the samples that represent the clusters to a first distance metric model;

performing training of a second distance metric model from the first distance metric model, based on labels set in pairs of the samples included in the training data, the training being a provisional training performed for a predetermined, limited number of epochs, substantially fewer than a number of epochs required for model convergence;

calculating a second embedded vector for each of the clusters, by inputting the samples that represent the clusters to the provisionally trained second distance metric model;

detecting pairs of the clusters that are likely to be integrated when the training is performed with a greater number of epochs than the number of epochs, based on comparison of the first embedded vector and the second embedded vector, the detecting including calculating an amount of change in a distance between the clusters before and after the provisional training;

identifying, from among the detected pairs of the clusters, at least one pair being a candidate for unintended integration in which a similarity label is not set; and generating, on a graphical user interface, an interactive alert for controlling the retraining process, the alert notifying a developer of the at least one pair and comprising an option to select one of modifying training labels or interrupting retraining process.

2. The non-transitory computer-readable recording medium according to claim 1, wherein the outputting includes outputting a recommendation formed to set a dissimilarity label to the one of the pairs of the clusters in which the similarity label is not set.

3. A training support method comprising:

calculating a first embedded vector for each of clusters obtained by clustering samples included in training data, by inputting the samples that represent the clusters to a first distance metric model;

performing training of a second distance metric model from the first distance metric model, based on labels set in pairs of the samples included in the training data, the training being a provisional training performed for a predetermined, limited number of epochs, substantially fewer than a number of epochs required for model convergence;

calculating a second embedded vector for each of the clusters, by inputting the samples that represent the clusters to the provisionally trained second distance metric model;

detecting pairs of the clusters that are likely to be integrated when the training is performed with a greater number of epochs than the number of epochs, based on comparison of the first embedded vector and the second embedded vector, the detecting including calculating an amount of change in a distance between the clusters before and after the provisional training;

identifying, from among the detected pairs of the clusters, at least one pair being a candidate for unintended integration in which a similarity label is not set; and generating, on a graphical user interface, an interactive alert for controlling the retraining process, the alert notifying a developer of the at least one pair and comprising an option to select one of modifying training labels or interrupting retraining process.

4. The training support method according to claim 3, wherein the outputting includes outputting a recommendation formed to set a dissimilarity label to the one of the pairs of the clusters in which the similarity label is not set.

5. An information processing device comprising:

a memory; and a processor coupled to the memory and configured to:

calculate a first embedded vector for each of clusters obtained by clustering samples included in training data, by inputting the samples that represent the clusters to a first distance metric model;

perform training of a second distance metric model from the first distance metric model, based on labels set in pairs of the samples included in the training data, the training being a provisional training performed for a predetermined, limited number of epochs, substantially fewer than a number of epochs required for model convergence;

calculate a second embedded vector for each of the clusters, by inputting the samples that represent the clusters to the provisionally trained second distance metric model;

detect pairs of the clusters that are likely to be integrated when the training is performed with a greater number of epochs than the number of epochs, based on comparison of the first embedded vector and the second embedded vector, the detecting including calculating an amount of change in a distance between the clusters before and after the provisional trainingd;

identify, from among the detected pairs of the clusters, at least one pair being a candidate for unintended integration in which a similarity label is not set; and generate, on a graphical user interface, an interactive alert for controlling the retraining process, the alert notifying a developer of the at least one pair and comprising an option to select one of modifying training labels or interrupting retraining process.

6. The information processing device according to claim 5, wherein the processor outputs a recommendation formed to set a dissimilarity label to the one of the pairs of the clusters in which the similarity label is not set.

*   *   *   *   *